US008688673B2

(12) United States Patent
Sarkar

(10) Patent No.: US 8,688,673 B2
(45) Date of Patent: Apr. 1, 2014

(54) SYSTEM FOR COMMUNICATION AND COLLABORATION

(75) Inventor: Devajyoti Sarkar, Singapore (SG)

(73) Assignee: Sarkar Pte Ltd, Singapore (SG)

( * ) Notice: Subject to any disclaimer, the term of this patent is extended or adjusted under 35 U.S.C. 154(b) by 834 days.

(21) Appl. No.: 11/992,665

(22) PCT Filed: Sep. 26, 2006

(86) PCT No.: PCT/SG2006/000280
§ 371 (c)(1),
(2), (4) Date: Mar. 27, 2008

(87) PCT Pub. No.: WO2007/037764
PCT Pub. Date: Apr. 5, 2007

(65) Prior Publication Data
US 2010/0223261 A1    Sep. 2, 2010

(30) Foreign Application Priority Data

Sep. 27, 2005  (WO) ................ PCT/SG2005/000320
Sep. 28, 2005  (WO) ................ PCT/SG2005/000321

(51) Int. Cl.
*G06F 17/30*    (2006.01)
(52) U.S. Cl.
USPC ......................................... 707/706; 707/726
(58) Field of Classification Search
USPC ......... 707/705, 706, 708, 723, 728, 732, 737, 707/748, 726
See application file for complete search history.

(56) References Cited

U.S. PATENT DOCUMENTS

| 4,429,385 A | 1/1984 | Cichelli et al. |
| 4,839,853 A | 6/1989 | Deerwester et al. |
| 4,999,790 A | 3/1991 | Murayama et al. |
| 5,241,671 A | 8/1993 | Reed et al. |
| 5,307,266 A | 4/1994 | Hayashi et al. |
| 5,309,359 A | 5/1994 | Katz et al. |
| 5,355,447 A | 10/1994 | Knowlton |
| 5,404,295 A | 4/1995 | Katz et al. |
| 5,404,428 A | 4/1995 | Wu |
| 5,428,778 A | 6/1995 | Brookes |
| 5,619,709 A | 4/1997 | Caid et al. |
| 5,642,518 A | 6/1997 | Kiyama et al. |
| 5,664,740 A | 9/1997 | Alderman et al. |
| 5,668,966 A | 9/1997 | Ono et al. |
| 5,671,333 A | 9/1997 | Catlett et al. |

(Continued)

OTHER PUBLICATIONS

Nickel, Seth, "GNOME Storage," http://www.gnome.org/~seth/storage/, retrieved from archive.org on Apr. 30, 2008, 4 pages.

(Continued)

*Primary Examiner* — Cheryl Lewis
(74) *Attorney, Agent, or Firm* — Westerman, Hattori, Daniels & Adrian, LLP

(57) ABSTRACT

A system and method for communication and collaboration are disclosed. A generalized annotation based mechanism using an emergent self organization characteristic of the natural language of the annotations allows users to search for relevant items, users to search for relevant users, and items to search for relevant users based on aggregation of stored annotations having associations between keywords, items and users in a context space. Aggregations based on correlations between users, items and keywords, are used to form a collaborative content relevance that allows users to be directed to items or other users, and items to be directed to users.

73 Claims, 10 Drawing Sheets

Basic System Diagram

(56) References Cited

U.S. PATENT DOCUMENTS

| | | |
|---|---|---|
| 5,694,523 A | 12/1997 | Wical |
| 5,715,444 A | 2/1998 | Danish et al. |
| 5,732,384 A | 3/1998 | Ellert et al. |
| 5,745,776 A | 4/1998 | Sheppard, II |
| 5,752,250 A | 5/1998 | Minatogawa et al. |
| 5,787,421 A | 7/1998 | Nomiyama |
| 5,794,050 A | 8/1998 | Dahlgren et al. |
| 5,794,178 A | 8/1998 | Caid et al. |
| 5,809,471 A | 9/1998 | Brodsky |
| 5,857,206 A | 1/1999 | Tsutsumitake |
| 5,873,056 A | 2/1999 | Liddy et al. |
| 5,899,989 A | 5/1999 | Ikeuchi et al. |
| 5,905,965 A | 5/1999 | Asano et al. |
| 5,905,980 A | 5/1999 | Masuichi et al. |
| 5,907,838 A | 5/1999 | Miyasaka et al. |
| 5,909,679 A | 6/1999 | Hall |
| 5,930,784 A | 7/1999 | Hendrickson |
| 5,933,822 A | 8/1999 | Braden-Harder et al. |
| 5,940,821 A | 8/1999 | Wical |
| 5,963,940 A | 10/1999 | Liddy et al. |
| 5,970,486 A | 10/1999 | Yoshida et al. |
| 5,983,219 A | 11/1999 | Danish et al. |
| 5,983,231 A | 11/1999 | Minatogawa et al. |
| 5,987,470 A | 11/1999 | Meyers et al. |
| 5,995,920 A | 11/1999 | Carbonell et al. |
| 6,006,221 A | 12/1999 | Liddy et al. |
| 6,026,388 A | 2/2000 | Liddy et al. |
| 6,026,396 A | 2/2000 | Hall |
| 6,029,165 A | 2/2000 | Gable |
| 6,044,365 A | 3/2000 | Cannon et al. |
| 6,067,552 A | 5/2000 | Yu |
| 6,070,162 A | 5/2000 | Miyasaka et al. |
| 6,073,170 A | 6/2000 | Sumita et al. |
| 6,094,649 A | 7/2000 | Bowen et al. |
| 6,098,065 A | 8/2000 | Skillen et al. |
| 6,112,202 A | 8/2000 | Kleinberg |
| 6,161,090 A | 12/2000 | Kanevsky et al. |
| 6,166,733 A | 12/2000 | Yamada |
| 6,169,986 B1 | 1/2001 | Bowman et al. |
| 6,173,287 B1 | 1/2001 | Eberman et al. |
| 6,230,169 B1 | 5/2001 | Nagae |
| 6,243,723 B1 | 6/2001 | Ikeda et al. |
| 6,249,784 B1 | 6/2001 | Macke et al. |
| 6,285,999 B1 | 9/2001 | Page |
| 6,308,179 B1 | 10/2001 | Petersen et al. |
| 6,311,194 B1 | 10/2001 | Sheth et al. |
| 6,356,899 B1 | 3/2002 | Chakrabarti et al. |
| 6,421,675 B1 | 7/2002 | Ryan et al. |
| 6,426,761 B1 | 7/2002 | Kanevsky et al. |
| 6,446,081 B1 | 9/2002 | Preston |
| 6,480,837 B1 | 11/2002 | Dutta |
| 6,510,433 B1 | 1/2003 | Sharp et al. |
| 6,519,586 B2 | 2/2003 | Anick et al. |
| 6,519,603 B1 | 2/2003 | Bays et al. |
| 6,665,680 B2 | 12/2003 | Sharp et al. |
| 6,675,159 B1 | 1/2004 | Lin et al. |
| 6,704,739 B2 | 3/2004 | Craft et al. |
| 6,714,939 B2 | 3/2004 | Saldanha et al. |
| 6,725,259 B1 | 4/2004 | Bharat |
| 6,728,692 B1 | 4/2004 | Martinka et al. |
| 6,728,760 B1 | 4/2004 | Fairchild et al. |
| 6,763,349 B1 | 7/2004 | Sacco |
| 6,785,676 B2 | 8/2004 | Oblinger |
| 6,792,418 B1 | 9/2004 | Binnig et al. |
| 6,801,906 B1 | 10/2004 | Bates et al. |
| 6,938,029 B1 | 8/2005 | Tien |
| 7,013,307 B2 | 3/2006 | Bays et al. |
| 7,146,381 B1 | 12/2006 | Allen et al. |
| 7,191,119 B2 | 3/2007 | Epstein et al. |
| 7,236,969 B1 | 6/2007 | Skillen et al. |
| 7,299,222 B1 | 11/2007 | Hogan et al. |
| 7,328,216 B2 | 2/2008 | Hofmann et al. |
| 7,346,606 B2 | 3/2008 | Bharat |
| 7,444,358 B2 | 10/2008 | Paczkowski et al. |
| 2002/0150869 A1 | 10/2002 | Shpiro |
| 2002/0194154 A1 | 12/2002 | Levy et al. |
| 2002/0194201 A1 | 12/2002 | Wilbanks et al. |
| 2003/0050773 A1 | 3/2003 | Martinez et al. |
| 2003/0072263 A1 | 4/2003 | Peterson |
| 2003/0126136 A1 | 7/2003 | Omoigui |
| 2003/0135483 A1 | 7/2003 | Sharp et al. |
| 2004/0024739 A1 | 2/2004 | Copperman et al. |
| 2004/0034652 A1 | 2/2004 | Hofmann et al. |
| 2004/0049522 A1 | 3/2004 | Streepy, Jr. |
| 2004/0059708 A1 | 3/2004 | Dean et al. |
| 2004/0133537 A1 | 7/2004 | Uceda-Sosa |
| 2004/0267723 A1 | 12/2004 | Bharat |
| 2005/0033726 A1 | 2/2005 | Wu et al. |
| 2005/0091211 A1* | 4/2005 | Vernau et al. .................... 707/6 |
| 2005/0114324 A1 | 5/2005 | Mayer |
| 2005/0131762 A1 | 6/2005 | Bharat et al. |
| 2005/0216457 A1 | 9/2005 | Walther et al. |
| 2005/0222989 A1* | 10/2005 | Haveliwala et al. ............ 707/3 |
| 2005/0234891 A1 | 10/2005 | Walther et al. |
| 2005/0256867 A1 | 11/2005 | Walther et al. |
| 2005/0278317 A1 | 12/2005 | Gross et al. |
| 2006/0004914 A1* | 1/2006 | Kelly et al. .................. 709/219 |
| 2006/0036583 A1 | 2/2006 | Sondergaard et al. |
| 2006/0036598 A1* | 2/2006 | Wu ................................ 707/5 |
| 2006/0041550 A1 | 2/2006 | Bennett et al. |
| 2006/0041553 A1 | 2/2006 | Paczkowski et al. |
| 2006/0041562 A1 | 2/2006 | Paczkowski et al. |
| 2006/0074980 A1 | 4/2006 | Sarkar |
| 2006/0129596 A1 | 6/2006 | Bays et al. |
| 2006/0136435 A1 | 6/2006 | Nguyen et al. |
| 2006/0206460 A1 | 9/2006 | Gadkari |
| 2006/0224938 A1 | 10/2006 | Fikes et al. |
| 2007/0011155 A1 | 1/2007 | Sarkar |
| 2007/0019561 A1 | 1/2007 | Peterson |
| 2007/0083552 A1 | 4/2007 | Allen et al. |
| 2007/0156522 A1* | 7/2007 | Carpenter et al. ............. 705/14 |
| 2007/0174247 A1* | 7/2007 | Xu et al. ......................... 707/3 |
| 2007/0244873 A1 | 10/2007 | Skillen et al. |
| 2007/0244885 A1 | 10/2007 | Skillen et al. |
| 2007/0244886 A1 | 10/2007 | Skillen et al. |
| 2007/0288315 A1 | 12/2007 | Skillen et al. |
| 2008/0005064 A1* | 1/2008 | Sarukkai ......................... 707/3 |
| 2008/0104032 A1 | 5/2008 | Sarkar |
| 2008/0177994 A1 | 7/2008 | Mayer |

OTHER PUBLICATIONS

Bharat, Krishna et al., "Hilltop: A Search Engine based on Expert Documents," http://ftp.cs.toronto.edu/pub/reports/csrg/405/hilltop.html, 11 pages.

Borodin, Allen et al., "Link Analysis Ranking Algorithms, Theory, and Experiments," Mar. 25, 2004, pp. 1-55.

Brin, Sergey et al., "The Anatomy of a Large-Scale Hypertextual Web Search Engine," Computer Science Department, Stanford University, 20 pages.

Chakrabarti, Soumen et al., "Enhanced Hypertext Categorization Using Hyperlinks," ACM SIGMOD 1998, Seattle, WA, 1998, pp. 1-12.

Cohn, David et al., "The Missing Link—A Probabilistic Model of Document Content and Hypertext Connectivity," http://www.cs.cmu.edu/~cohn/papers/nips00.pdf, 7 pages.

Dean, Jeffrey et al., "MapReduce: Simplified Data Processing on Large Clusters," 2004, Operating Systems Design and Implementation, Proceedings of the 6th conference on Symposium on Operating Systems Design & Implementation, vol. 5, San Francisco, CA, 2004, pp. 1-13.

Deerwester, Scott et al., "Indexing by Latent Semantic Analysis," University of Chicago, http://lsa.colorado.edu/papers/JASIS.lsi.90.pdf, pp. 1-30 (34 pages total).

Eiron, Nadav et al., "Analysis of Anchor Text for Web Search," Annual ACM Conference on Research and Development in Information Retrieval, Proceedings of the 26th Annual International ACM SIGIR Conference on Research and Development in Information Retrieval, Toronto, Canada, 2003, 8 pages.

Flake, Garry William et al., "Self-organization, Self-regulation, and Self-similarity on the Fractal Web," Yahoo Research Labs, http://research.yahoo.com/node/273, pp. 97-127.

(56) References Cited

OTHER PUBLICATIONS

Jansen, Bernard J. et al., "Real Life, Real Users, and Real Needs: A Study and Analysis of User Queries on the Web," Information on Processing and Management vol. 36, No. 2, pp. 207-227 (16 pages).
Kleinberg, Jon M., "Authoritative Sources in a Hyperlinked Environment," http://www.cs.cornell.edu/home/kleinber/auth.pdf, 1999, pp. 1-33.
Kleinberg, Jon, "Complex Networks and Decentralized Search Algorithms," http://www.cs.cornell.edu/home/kleinber/icm06-swn.pdf, 2006, pp. 1-25.
Kolda, Tamara G. et al., "Higher-Order Web Link Analysis Using Multilinear Algebra," Sandia National Laboratories, SAND 2005-4548, Jul. 2005, pp. 3-16.
Kraft, Reiner et al., "Mining Anchor Test for Query Refinement," WWW 2004, May 17-22, 2004, New York City, New York, pp. 666-674.
Landauer, Thomas K. et al., "A Solution to Plato's Problem: The Latent Semantic Analysis Theory of Acquisition, Induction and Representation of Knowledge," Psychological Review, vol. 104, No. 2. (Apr. 1997), pp. 211-240 (57 pages).
Ng, Andrew Y. et al., "Stable Algorithms for Link Analysis," SIGIR '01, Sep. 9-12, 2001, New Orleans, LA, 9 pages.
Page, Larry et al., "The PageRank Citation Ranking: Bringing Order to the Web," Jan. 29, 1998, http://www-db.stanford.edu/~backrub/pageranksub.ps, pp. 1-17.
Silverstein, Craig et al., "Analysis of a Very Large Web Search Engine Query Log," 1999, http://www.cs.ucsb.edu/~almeroth/classes/techsoc/2005-Winter/papers/analysis.pdf, pp. 6-12.
Singhal, Amit, "Modern Information Retrieval: A Brief Overview," http://singhal.info/ieee2001.pdf, 2001, pp. 1-9.
Spink, Amanda et al., "Searching the Web: The Public and Their Queries," Journal of the American Society for Information Science and Technology, vol. 53, No. 3, 2001, pp. 226-234.
Sun, Jian-Tao et al., "CubeSVD: A Novel Approach to Personalized Web Search," 2005, WWW 2005, May 10-14, 2005, Chiba, Japan, pp. 382-390.
Teevan, Jaime et al., "Personalizing Search via Automated Analysis of Interests and Activities," SIGIR '05, Aug. 15-19, 2005, Salvador, Brazil, 8 pages.
Allen, James, "Chapter 10—Ambiguity Resolution," Natural Language Understanding, $2^{nd}$ Ed., The Benjamin/Cummings Publishing Company, Inc., 1995, pp. 295-321.
Baeza-Yates et al., "Modern Information Retrieval," ACM Press, New York, Addison Wesley, 1999, 2 pages.
Bates, Marcia J., "Indexing and Access for Digital Libraries and the Internet: Human, Database, and Domain Factors," Journal of the American Society for Information Science, 1996, 44 pages.
Berners-Lee, Tim, "Semantic Web Road Map," http://www.w3.org/DesignIssues/Semantic.html, last modified Oct. 1998, pp. 1-6.
Berners-Lee et al., "The Semantic Web," Scientific American.com, http://www.sciam.com/print_version.cfm?articleID=00048144-10D2-1C70-84A9809EC588EF21, May 17, 2001, pp. 1-18.
Bjelland, Tor Kristian, "Classification: Assumptions and Implications for Conceptual Modeling," Dissertation in Information Science, University of Bergen, Department of Information Science and Media Studies, Faculty of Social Science, 2004, pp. 1-240.
Brickley et al., editors, "RDF Vocabulary Description Language 1.0: RDF Schema," W3C Recommendation, Feb. 10, 2004, http://www.w3.org/TR/2004/REC-rdf-schema-20040210/, 31 pages.
Buitelaar, Paul, "Reducing Lexical Semantic Complexity With Systematic Polyemous Classes and Underspecification," DFKI Language Technology Lab, Saarbrü cken, Germany, 2000, pp. 14-19.
Cayzer, Steve, "Semantic Blogging: Spreading the Semantic Web Meme," HP Laboratories, Mar. 2004, 25 pages.
Chang et al., "Mind Your Vocabulary: Query Mapping Across Heterogeneous Information Sources," Stanford University, 1999, pp. 1-12.
Chen, Peter Pin-Shan, "The Entity-Relationship Model—Toward a Unified View of Data," ACM Transactions on Database Systems, vol. 1, No. 1, Mar. 1976, pp. 9-36.
Codd, E.F., "A Relational Model of Data for Large Shared Data Banks," Communications of the ACM, vol. 13, No. 6, Jun. 1970, pp. 377-387.
Doctorow, Cory, "Metacrap: Putting the Torch to Seven Straw-Men of the Meta-Utopia," Metacrap, Version 1.3, Aug. 26, 2001, pp. 1-6.
Dumbill, Edd, "XML Watch: Finding Friends With XML and RDF," IBM, Jun. 1, 2002, 9 pages.
Erwig, Martin et al., "Keyquery—A Front End for the Automatic Translation of Keywords Into Structured Queries," Department of EECS, Oregon State University, 10 pages.
Fielding, Roy Thomas, "Architectural Styles and the Design of Network-Based Software Architectures," Dissertation, Doctor of Philosophy in Information and Computer Science, University of California, Irvine, 2000, pp. 1-162.
Fillies et al., "On Visualizing the Semantic Web in MS Office," SemTalk™, 10 pages.
Fong, Joseph, "Converting Relational to Object-Oriented Databases," Computer Science Department, City University of Hong Kong, pp. 1-6.
Girju et al., "Support Vector Machines Applied to the Classification of Semantic Relations in Nominalized Noun Phrases," In the Proceedings of the Human Language Technology (HLT/NAACL) Workshop on Computational Lexical Semantics, pp. 1-8, 2004.
Guha et al., "Semantic Search," http://tap.stanford.edu/ess.pdf, 20 pages.
Hearst, Marti A., "Chapter 10: User Interfaces and Visualization," Modern Information Retrieval, 1999, pp. 257-288.
Karger, David R. et al., "Prerequisites for a Personalizable User Interface," User Interfaces (IUI) Workshop on Behavior-based User Interface Customization, 2004, 4 pages.
Katz, Boris et al., "Annotating the World Wide Web," Artificial Intelligence Laboratory, MIT, In Proceedings of the $5^{th}$ RIAO Conference on Computer Assisted Information Searching on the Internet (RIAO 97), 1997, pp. 253-254.
Lin, Jimmy et al., "Aranea: Mining Answers From the World Wide Web," Artificial Intelligence Laboratory, MiT, In Proceedings of the $5^{th}$ RIAO Conference on Computer Assisted Information Searching on the Internet (RIAO 97), 1997, pp. 282-284.
Manning, Christopher D. et al., "Statistical Machine Translation," Foundations of Statistical Natural Language Processing, The MIT Press, Cambridge, Massachusetts, 1999, pp. 486-494.
Manola, Frank et al., eds., "RDF Primer," W3C Recommendation, Feb. 10, 2004, http://www.w3.org/TR/2004/REC-rdf-primer-20040210/, 139 pages.
Marchiori et al., "Towards the Semanaic Web: Metalog," The World Wide Web Consortium, http://www.w3.org/RDF/Metalog/history/html (18 pages).
Mathes, Adam, "Folksonomies—Cooperative Classification and Communication Through Shared Metadata," Computer Mediated Communication—LIS590CMC, Graduate School of Library and Information Science, University of Illinois Urbana-Champaign, Dec. 2004, pp. 1-9.
McGuinness, Deborah L. et al., "Owl Web Ontology Language Overview," W3C Recommendation, Feb. 10, http://www.w3.org/TR/2004/REC-owl-features-20040210/, 2004, 21 pages.
Miles, Alistair J. et al., "SKOS-Core 1.0 Guide, an RDF Schema for Thesauri and Related Knowledge Organisation Systems," SWAD—Europe Thesaurus Activity, SWAD Europe, W3C, http://www.w3.org/2001/sw/Europe/reports/thes/1.0/guide/20040805/, 2004, 18 pages.
Miles, Alistair J. et al., "SKOS-Core Guidelines for Migration, Guidelines and Case Studies for Generating RDF Encodings of Existing Thesauri," SWAD—Europe Thesaurus Activity, SWAD Europe, W3C, http://www.w3.org/2001/sw/Europe/reports/thes/1.0/migrate/20040805/, 2004, 26 pages.
Miller, George A. et al., "Introduction to Wordnet: An On-Line Lexical Database," Cognitive Science Laboratory, Princeton University, Aug. 1993, 88 pages.
Moldovan et al., "Models for the Semantic Classification of Noun Phrases," In the Proceedings of the Human Language Technology (HLT/NAACL) Workshop on Computational Lexical Semantics, 2004, pp. 1-8.

(56) References Cited

OTHER PUBLICATIONS

Myers, Chuck, "XMP™ Adding Intelligence to Media," WWW2004: Semantic Web Implementation at Adobe, Adobe System Incorporated, May 20, 2004, 20 pages.

Nickell, Seth, "A Cognitive Defense of Associative Interfaces for Object Reference," http://www.gnone.org/~seth/storage/associative-interfaces.pdf, publication date unknown, 12 pages.

Nickell, Seth, "GNOME Storage," http://www.gnome.org/~seth/storage/, publication date unknown, 7 pages.

Noy, Natasha, "Representing Classes As Property Values on the Semantic Web," W3C Working Draft, http://www.w3.org/TR/2004/WD-swpb-classes-as-values-20040721, Jul. 21, 2004, 12 pages.

Pedersen, Gert Schmeltz, "A Browser for Bibliographic Information Retrieval, Based on an Application of Lattice Theory," Proceedings of the 16th Annual International ACM SIGIR Conference on Research and Development in Information Retrieval, Philadelphia, PA, pp. 270-279.

Priss, Uta, "Formal Concept Analysis in Information Science," Annual Review on Information Science and Technology, ASIST, vol. 40, 1993, pp. 1-22.

Priss, Uta, "Lattice-Based Information Retrieval," School of Library and Information Science, Indiana University Bloomington, 2000, pp. 1-15.

Quan, Dennis et al., "Capturing Ontological Information From Users," http://www.ai.mit.edu/people/dquan/uist2003-useront.pdf, 10 pages.

Quan, Dennis, "Designing End User Information Environments Built on Semistructured Data Models," Doctoral Dissertation, Submitted to the Department of Electrical Engineering and Computer Science at the Massachusetts Institute of Technology, Jun. 2003, 214 pages.

Quan, Dennis et al., "How to Make a Semantic Web Browser," WWW 2004, May 17-22, 2004, New York, NY, 11 pages.

Rector, Brent, "Chapter 1: The Longhorn Application Model," MSDN Home, Longhorn Developer Center Home: Introducing Longhorn for Developers, Oct. 2003, 13 pages.

Rector, Brent, "Chapter 2: Building a 'Longhorn' Application," MSDN Home, Longhorn Developer Center Home: Introducing Longhorn for Developers, Nov. 2003, 19 pages.

Rector, Brent, "Chapter 3: Controls and XAML," MSDN Home, Longhorn Developer Center Home: Introducing Longhorn for Developers, Dec. 2003, 33 pages.

Rector, Brent, "Chapter 4: Storage," MSDN Home, Longhorn Developer Center Home: Introducing Longhorn for Developers, Jan. 2004, 24 pages.

Rector, Brent, "Chapter 5: Data Binding," MSDN Home, Longhorn Developer Center Home: Introducing Longhorn for Developers, Feb. 2004, 13 pages.

Rector, Brent, "Chapter 6: Communication," MSDN Home, Longhorn Developer Center Home: Introducing Longhorn for Developers, Mar. 2004, 38 pages.

Rector, Brent, "Chapter 7: Creating Mobility-Aware Longhorn Applications," MSDN Home, Longhorn Developer Center Home: Introducing Longhorn for Developers, Apr. 2004, 12 pages.

Rector, Brent, "Introducing Longhorn for Developers," MSDN Home, Longhorn Developer Center Home: Introducing Longhorn for Developers, 2 pages.

Rector, Brent, "Introduction," MSDN Home, Longhorn Developer Center Home: Introducing Longhorn for Developers, Oct. 2003, 7 pages.

Reed, Stephen L. et al., "Mapping Ontologies Into Cyc," American Association for Artificial Intelligence (www.aaai.org), http://www.cyc.com/doc/white_papers/mapping-ontologies-into-cyc_v31.pdf, 2002, 6 pages.

Shirky, Clay, "Clay Shirky'S Writings About the Internet, Economics & Culture, Media & Community: Ontology is Overrated—Categories, Links, and Tags," http://shirky.com/writings/ontology_overrated.html, 2005, pp. 1-14.

Smith, Michael K. et al., "Owl Web Ontology Language Guide," W3C Recommendation, Feb. 10, 2004, http://www.w3.org/TR/2004/REC-owl-guide-20040210/, 60 pages.

Steels, L. et al., "Crucial Factors in the Origins of Word-Meaning," In Wray, A., editor, The Transition to Language. Oxford University Press, Oxford, UK, http://citeseer.ist.psu.edu/steels00crucial.html, 2002, pp. 1-29.

van Ossenbruggen et al., "Hypermedia and the Semantic Web: A Research Agenda," Journal of Digital Information, vol. 3, Issue 1, May 17, 2002, pp. 1-18.

Woods, W.A., "Searching Versus Finding: Why Systems Need Knowledge to Find What You Really Want," Sun Microsystems Laboratories, 2004, pp. 1-19.

"W3C Semantic Web Activity," W3C Semantic Web, www.w3.org/2001/sw/, publication date unknown, 5 pages.

"Grassroots Cooperative Categorization of Digital Content Assets: Folksonomies, What They Are, Why They Work," Knowledge Management, Jan. 5, 2005, pp. 1-12.

"Categorization," Wikipedia, http://en.wikipedia.org/wiki/Categorization, Jul. 19, 2005, pp. 1-2.

"Using Technorati Tags," Technorati Help: Tags, http://www.technorati.com/help/tags.html, pp. 1-2.

"del.icio.us/about/," http://del.icio.us/doc/about, pp. 1-3.

"Mac OS X Tiger: Spotlight Technologies," Apple—Mac OS X—Tiger Preview—Spotlight Technologies, http://www.apple.com/macosx/tiger/spotlighttech.html, 2 pages.

"Metalog—towards the Semantic Web," W3C Technology and Society Domain, Semantic Web Activity, http://www.w3.org/RDF/Metalog/, publication date unknown, 4 pages.

Project Fenfire, http://www.nongnu.org/fenfire/, 5 pages.

Microsoft Office 2003 Smart Tag SDK, "Building Smart Tags for Two Office Versions," MSDN Home: MSDN Library: Office Solutions Development: Microsoft Office, Jul. 2004, 1 page.

Microsoft Office 2003 Smart Tag SDK, "Overview of Smart Tag Development," MSDN Home: MSDN Library: Office Solutions Development: Microsoft Office, Jul. 2004, 3 pages.

Microsoft Office 2003 Smart Tag SDK, "Performance," MSDN Home: MSDN Library: Office Solutions Development: Microsoft Office, Jul. 2004, 2 pages.

Microsoft Office 2003 Smart Tag SDK, "Project Ideas," MSDN Home: MSDN Library: Office Solutions Development: Microsoft Office, Jul. 2004, 2 pages.

Microsoft Office 2003 Smart Tag SDK, "Recognizer Conflicts," MSDN Home: MSDN Library: Office Solutions Development: Microsoft Office, Jul. 2004, 2 pages.

Microsoft Office 2003 Smart Tag SDK, "Recognizers and Actions at Work," MSDN Home: MSDN Library: Office Solutions Development: Microsoft Office, Jul. 2004, 3 pages.

Microsoft Office 2003 Smart Tag SDK, "Smart Tag Architecture," MSDN Home: MSDN Library: Office Solutions Development: Microsoft Office, Jul. 2004, 2 pages.

Microsoft Office 2003 Smart Tag SDK, "Smart Tag Associated to a Document Using XML," MSDN Home: MSDN Library: Office Solutions Development: Microsoft Office, Jul. 2004, 2 pages.

Microsoft Office 2003 Smart Tag SDK, "Smart Tag Reloading Without Restarting the Application," MSDN Home: MSDN Library: Office Solutions Development: Microsoft Office, Jul. 2004, 2 pages.

Microsoft Office 2003 Smart Tag SDK, "Smart Tag Types," MSDN Home: MSDN Library: Office Solutions Development: Microsoft Office, Jul. 2004, 2 pages.

The FOAF Project, http://www.foaf-project.org/, Jul. 28, 2003, 22 pages.

Faceted Classification, http://www.slais.ubc.ca/courses/libr517/winter2000/Group7/facet.htm, 2 pages.

Facets and Controlled Vocabularies, https://www.boxesandarrows.comm/archives/all_about_facets_controlled_vocabularies.

* cited by examiner

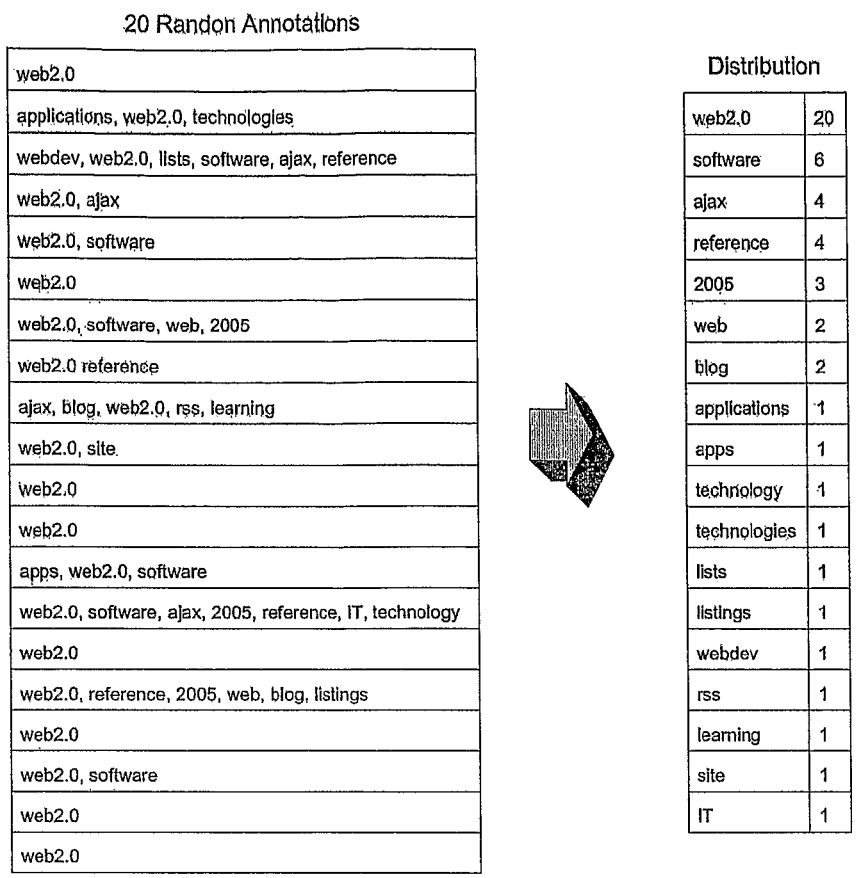
Fig 1: Annotations for http://web2.wsj2.com at del.icio.us
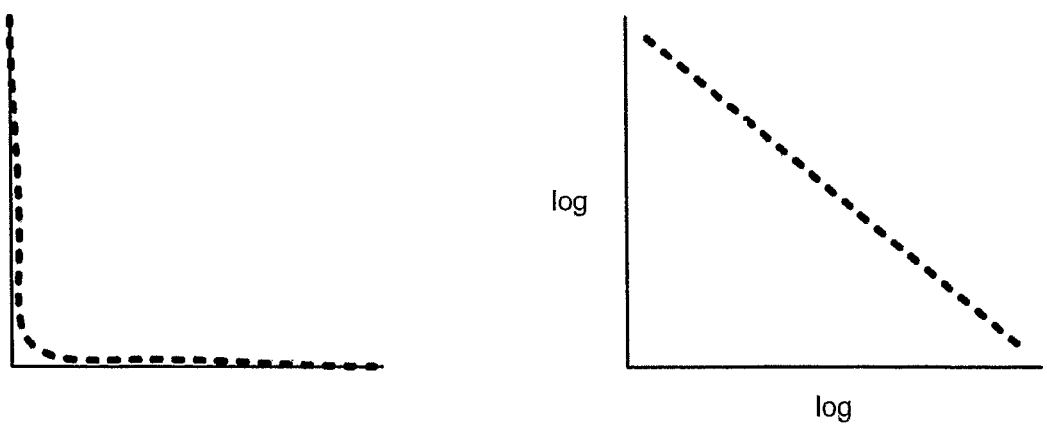
Fig 2: Power Law Distribution

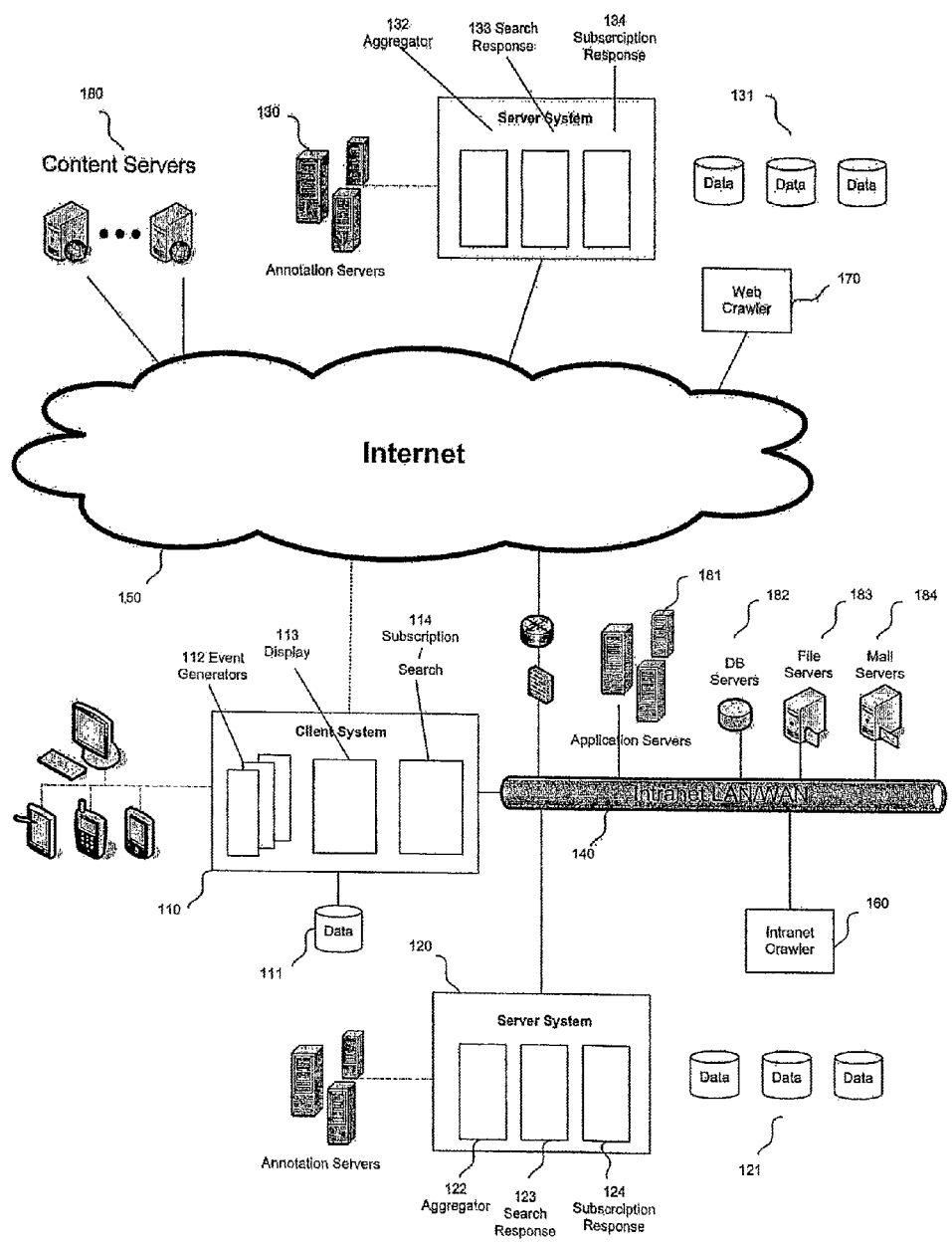
Fig 3. Basic System Diagram

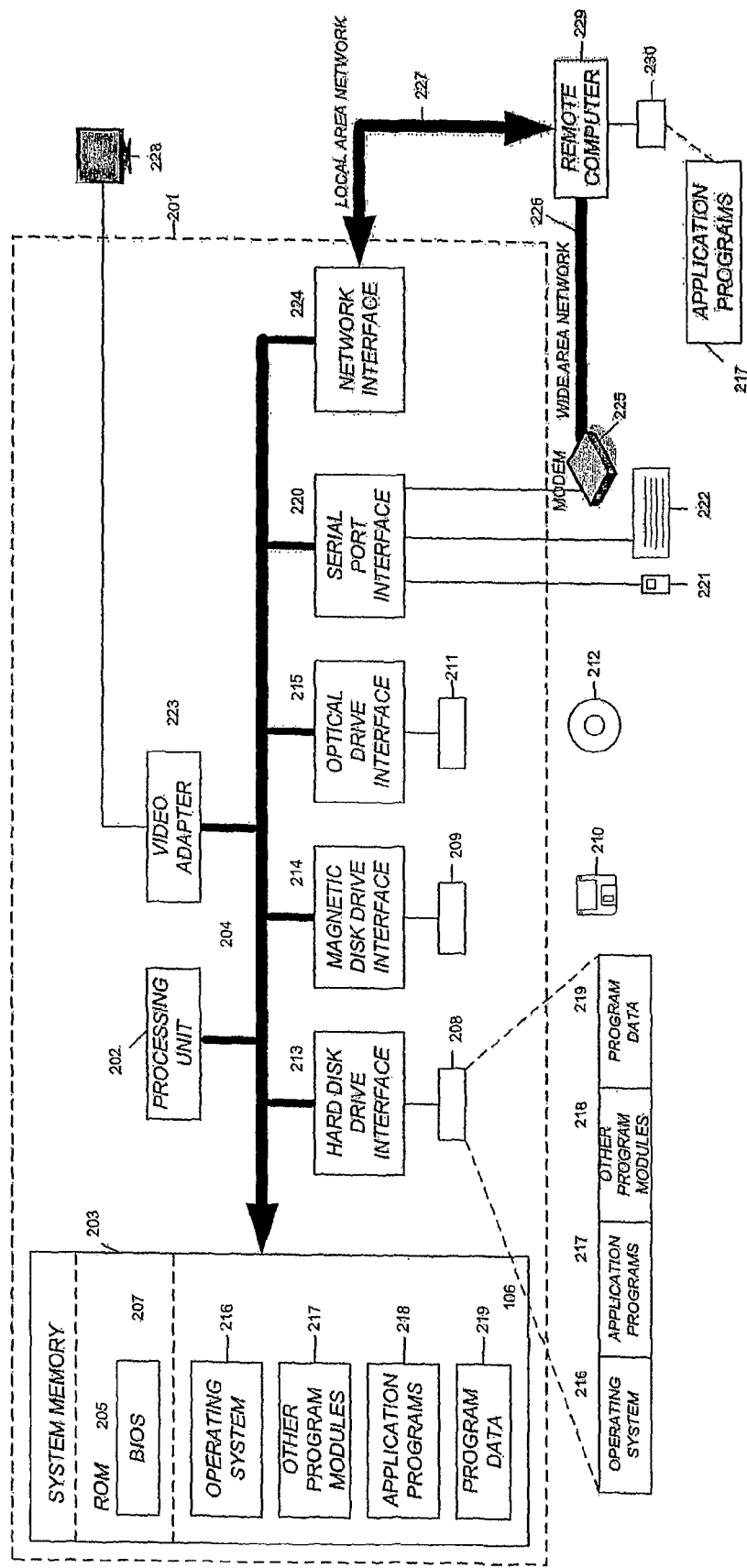
Figure 4 Exemplar Computing Environment

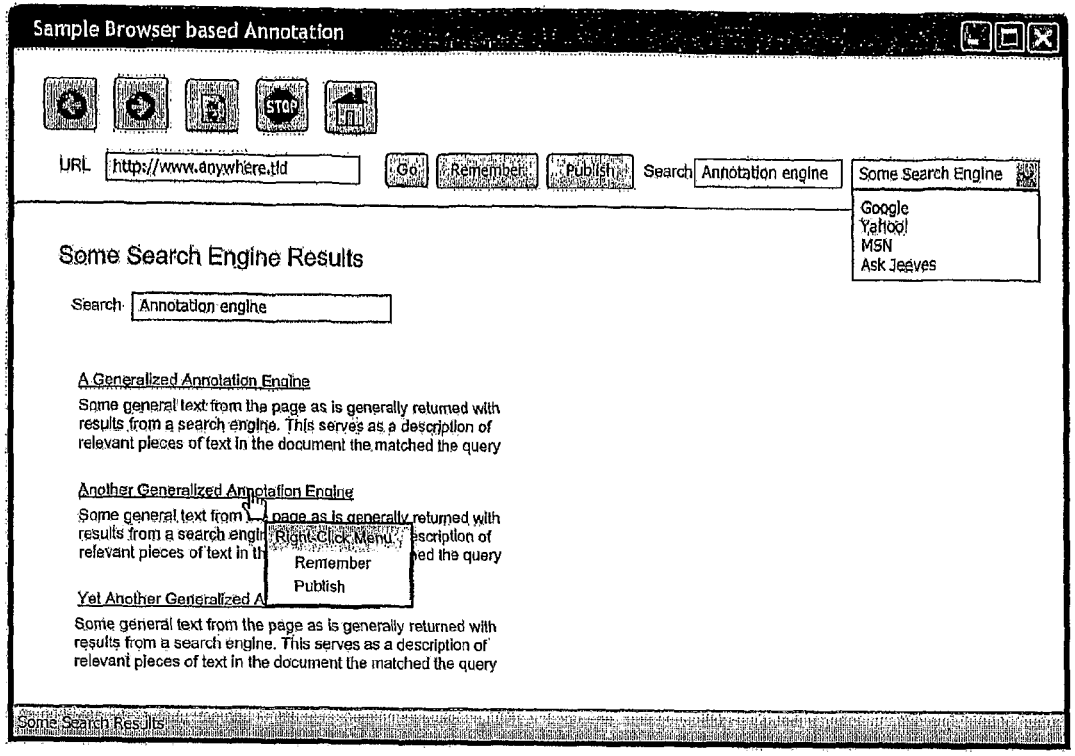
Fig 5: Example of a browser based Annotation Event generator
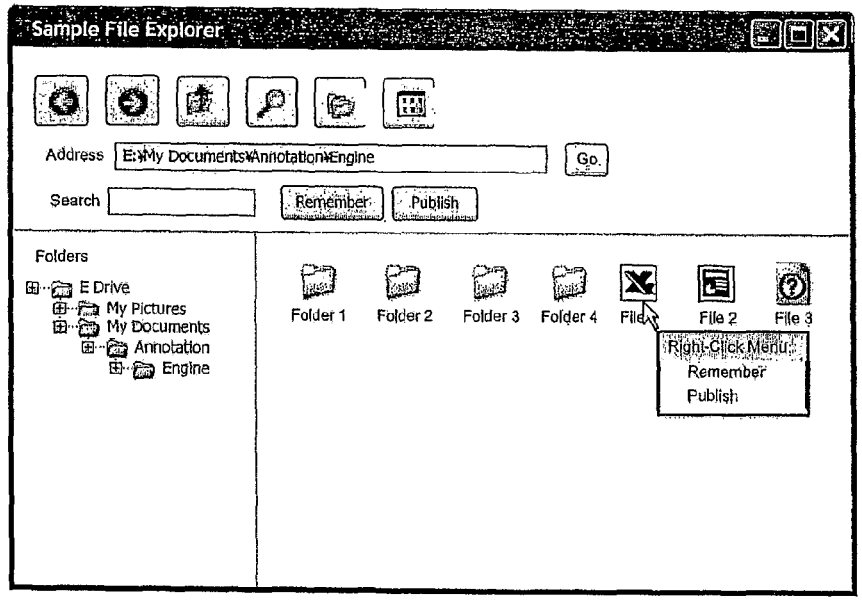
Fig 6. Example of a File System based Annotation Event generator

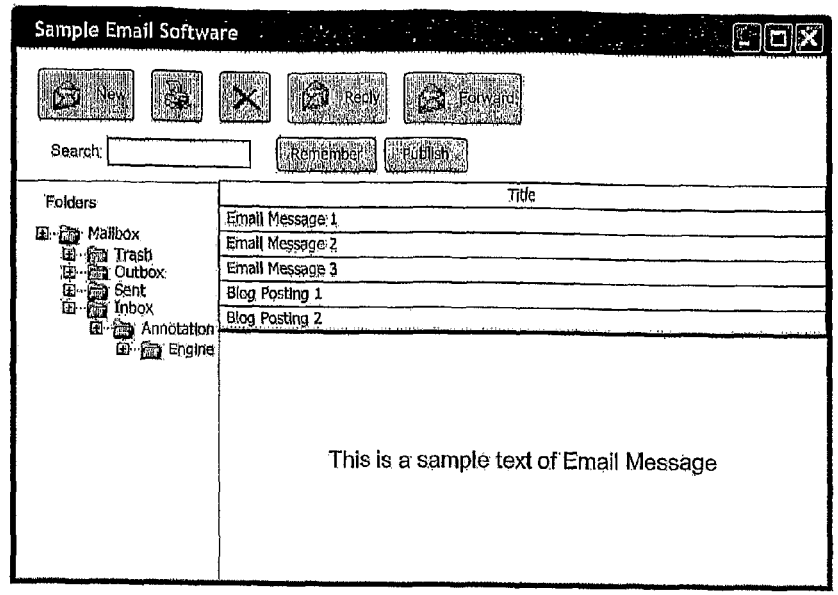
Fig 7. Example of an Email Software based Annotation Event generator
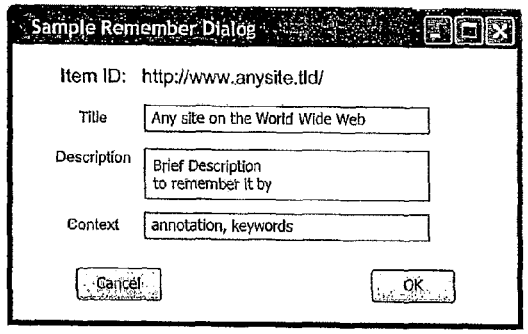
Fig 8. Example Remember Dialog
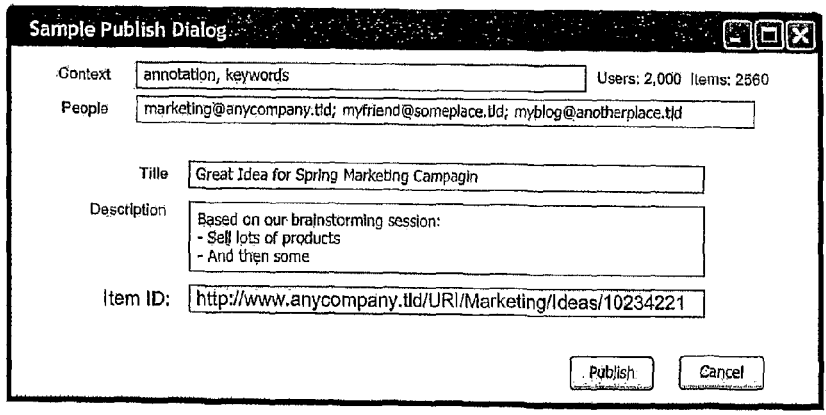
Fig 9. Example Publish Dialog

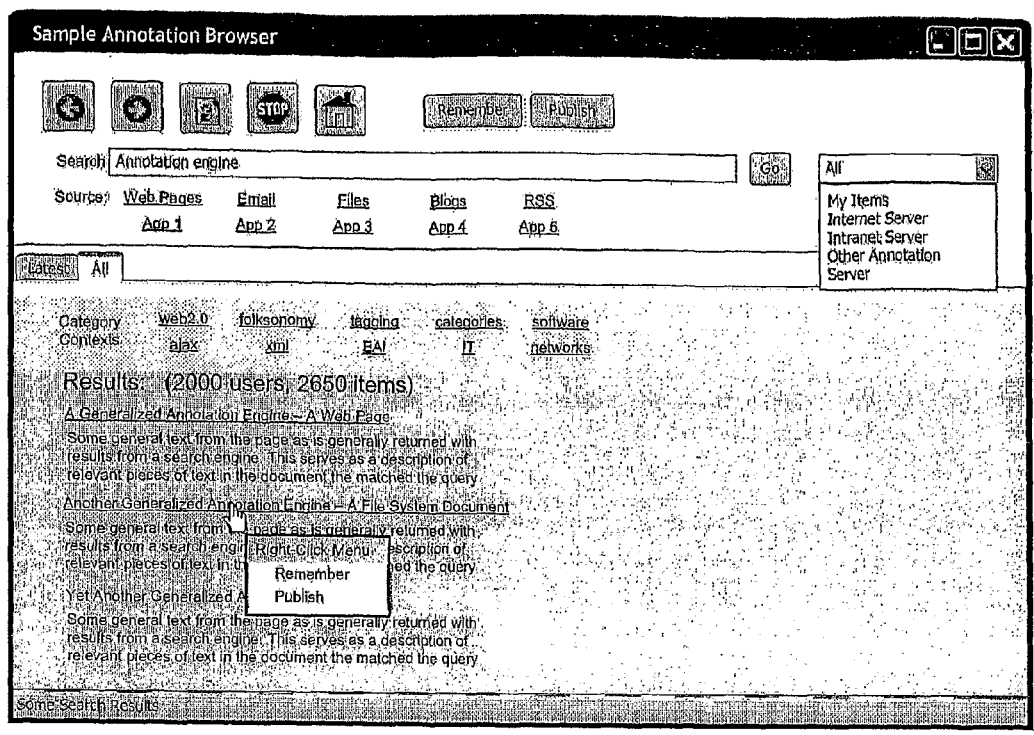
Fig 10: Example of a Annotation browser

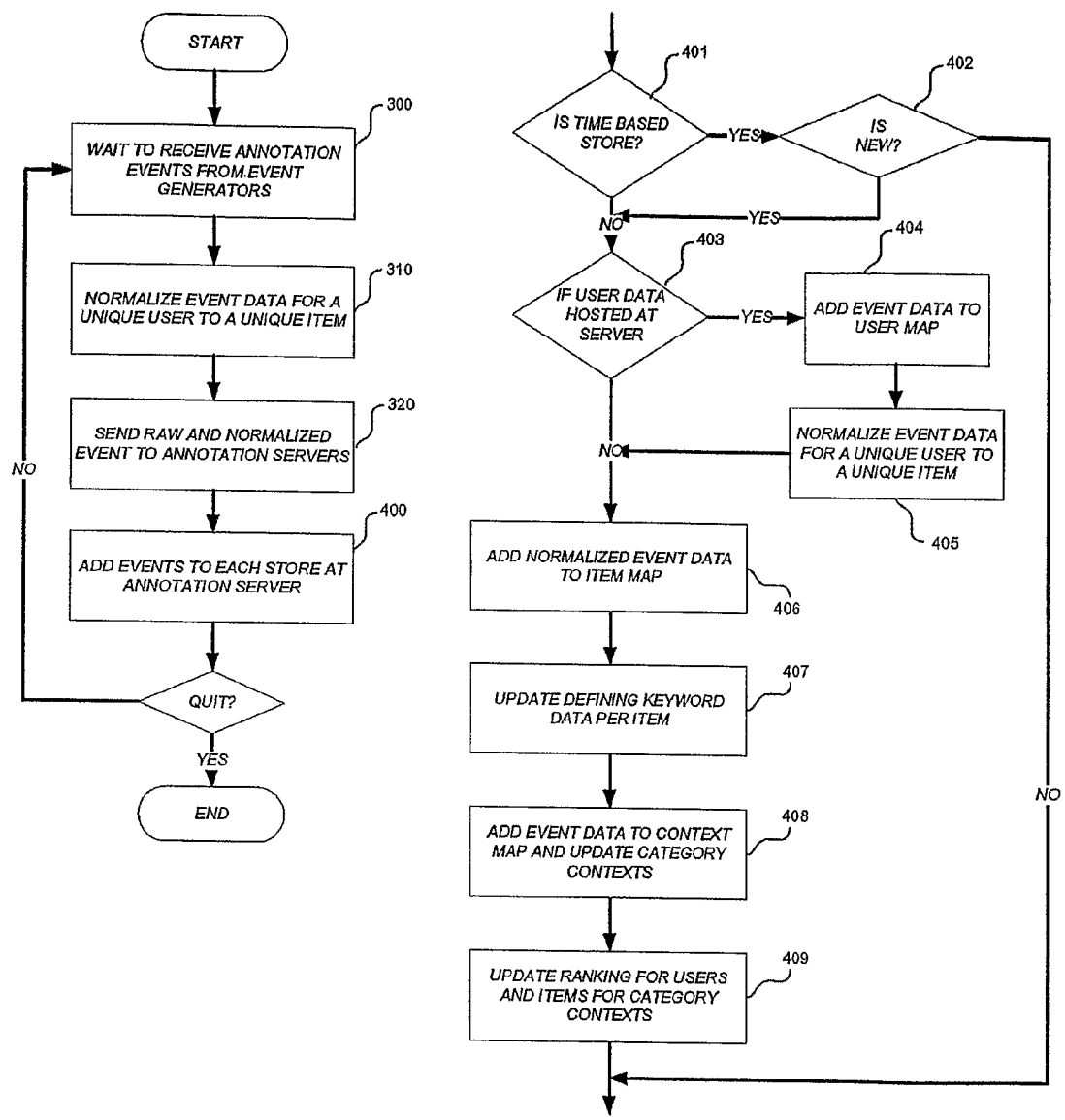
Figure 11 Annotation Aggregation
ADDING AN EVENT TO EACH STORE

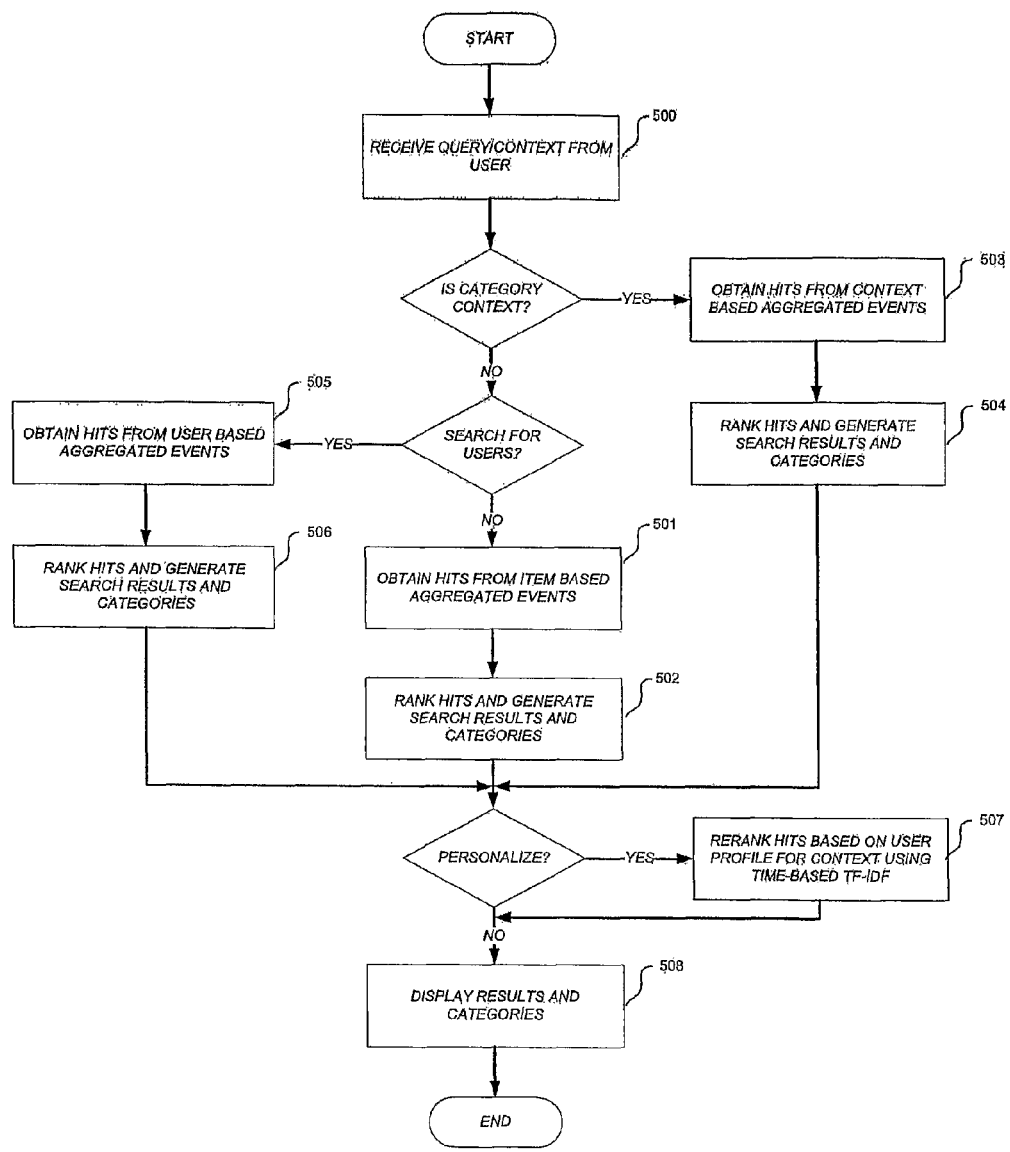
Figure 12: Search and Personalization

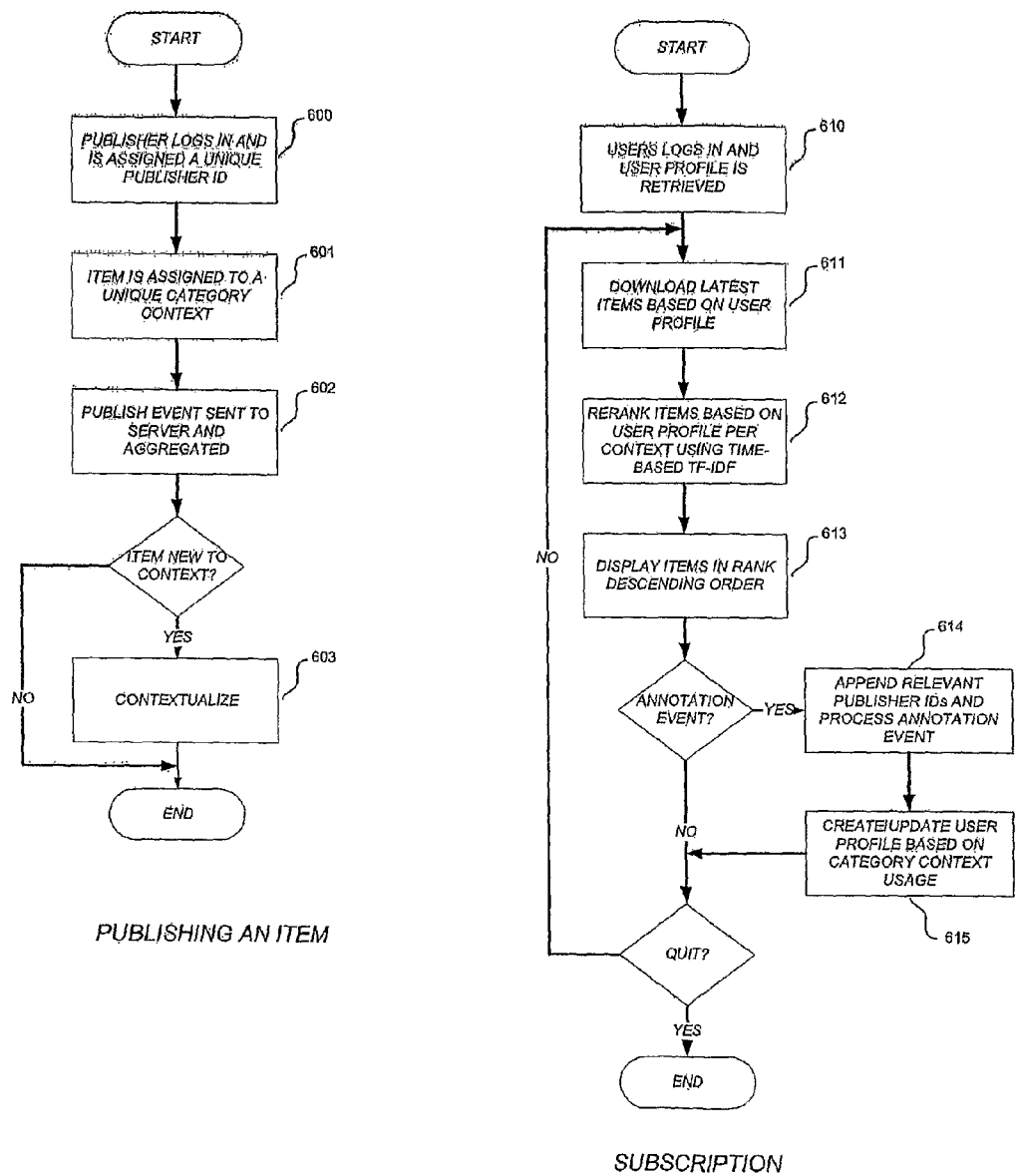
Figure 13: Publish and Subscribe
*PUBLISHING AN ITEM*
*SUBSCRIPTION*

```
<AnnotationEvent>
        <EventSourceID>123456</EventSourceID>
        <EventSourceLabel>RememberDialog</EventSourceLabel>
        <UserID>http://annotationserver/UserID/JohnDoe</UserID>
        <Item>
                <ItemID>http://www.anysite.tld</ItemID>
                <Title>Any site on the World Wide Web</Title>
                <Description>Brief description to remember it by</Description>
        </Item>
        <OriginalPublisherID/>
        <PublisherID/>
        <Keyword>annotation</Keyword>
        <Keyword>keywords</Keyword>
</AnnotationEvent>
```

Fig 14: Example of a Remember Annotation Event

```
<AnnotationEvent>
        <EventSourceID>234567</EventSourceID>
        <EventSourceLabel>ClickStream</EventSourceLabel>
        <UserID>http://annotationserver/UserID/JohnDoe</UserID>
        <Item>
                <ItemID>http://www.anysite.tld</ItemID>
                <Title/>
                <Description/>
        </Item>
        <OriginalPublisherID>Original</OriginalPublisherID>
        <PublisherID>Known</PublisherID>
        <Keyword>annotation</Keyword>
        <Keyword>keywords</Keyword>
</AnnotationEvent>
```

Fig 15: Example of a Subscription ClickStream Annotation Event

```
<PublishingEvent>
        <EventSourceID>345678</EventSourceID>
        <EventSourceLabel>PublishDialog</EventSourceLabel>
        <UserID>http://annotationserver/UserID/JohnDoe</UserID>
        <Item>
                <ItemID>http://www.anycompany.tld/URI/Marketing/Ideas/10234221</ItemID>
                <Title>Great Ideas for Spring Marketing Campaign</Title>
                <Description>Based on our brainstorming session
                        - Sell lots of products
                        - And then some</Description>
        </Item>
        <OriginalPublisherID>JohnDoePublisherID</OriginalPublisherID>
        <PublisherID>JohnDoePublisherID</PublisherID>
        <Keyword>annotation</Keyword>
        <Keyword>keywords</Keyword>
</PublishingEvent>
```

Fig 16: Example of an Publishing Event

SYSTEM FOR COMMUNICATION AND COLLABORATION

CROSS REFERENCE TO RELATED APPLICATIONS

This application is a national phase application based on PCT/SG2006/000280, filed Sep. 26, 2006, which claims the priority of International Patent Application No. PCT/SG2005/000320, filed on Sep. 27, 2005; International Patent Application No. PCT/SG2005/000321, filed on Sep. 28, 2005; and U.S. patent application Ser. No. 11/440,896, filed on May 24, 2006, the contents of all of which are incorporated herein by reference.

TECHNICAL FIELD

The present invention relates to a method for communication and collaboration that extends the notion of search so as to permit both items and users to be searched and ranked on existing Information Retrieval ranking techniques. This is utilized to provide a context-based communication mechanism.

BACKGROUND OF THE INVENTION

Background

The advent of the World Wide Web and near ubiquitous presence of computers has dramatically changed the way people find and use information. Yet as we enter the $21^{st}$ century, we are faced with a unique dilemma. Information and knowledge is more important than ever before and is being produced in increasing quantities, but it is getting more and more difficult to find useful and relevant information.

Web search technology represents a major break-through in this field. Early search engines created web crawlers or spiders that were software programs that traversed the graph of pages on the web and downloaded them to a central server. These were then put into an inverted index and searched based on Information Retrieval (IR) methods. A person could search for all documents that contained a word or a set of words. While useful for small collections of pages, this could not scale. The usefulness of the search was compromised by large numbers of returned documents that were not relevant to the query. Thus important documents could not be found as it was not practical to scan all the results to find the relevant ones.

This "abundance" problem was addressed in early seminal papers of Kleinberg, Page and Brin. They used hyperlinks between documents as a proxy for relevance judgments. It was already known that pages linked to by many other pages appeared to be more relevant than the average. Page and Brin refined this notion with the intuition that it is not only important how many pages point to a page, but also what the quality of these pages were. They proposed the PageRank method which is used in the Google search engine. This is a query independent ranking of pages based on the pages that link to that page.

Kleinberg proposed a more refined notion of the quality of web pages. He argued that it is not necessary that good pages point to other good pages (which he called authorities). Instead, there are special nodes called hubs that contain collections of links to good authorities. The HITS algorithm evaluated quality based on both hubs and authorities with the intuition that a good hub was one that linked to many good authorities and a good authority was one that was linked to by many good hubs. This was calculated in a query dependant fashion.

These methods allowed for harvesting collective intelligence across the network to aid in bringing out relevant and useful pages to the top of search results. The success of such Link Analysis and Ranking (LAR) algorithms is clearly visible in the success of Google. This gave rise to considerable research in this area and there are many variants of the above algorithms like Hilltop, SALSA, Randomized HITS, Subspace HITS, and others. More recently, three-level algorithms like TOPHITS have been proposed that leverage tensor decomposition of three variables to improve quality of results. HITS suffered from topic drift where the initial pages used to calculate hubs and authorities may not have been entirely related to the topic of the query. TOPHITS uses link text (text in the hyperlink) to improve HITS by assigning relevance of a hub and authority to the topic of the query.

Yet, even after advances in web search technologies there still remain many major problems. An average query returns millions of results. If the desired page is not found in the top 10 or 20 results, the search is fruitless. This problem is compounded by the fact that all users get the same results for the same query, even though they may have widely varying information needs. On the flip side, the average query on the web is 2.3 words. This makes it very difficult for the search engine to cater to information needs of all users. One approach that major players are taking to alleviate this problem is personalized search. CubeSVD is a recent tensor decomposition approach to personalized search by using a user's Clickstream (the query results that a user clicks on) to determine relevance for a user. But there remain significant privacy concerns depending on the way personalization is implemented and it still remains to be seen whether these approaches are effective.

The situation in Enterprise search, such as searching corporate intranet web pages or file shares, and Desktop search is even worse. Some studies estimate that as much as 80% of all corporate data is unstructured (not in databases or applications) such as files, email, etc. Due to the absence of hyperlink connectivity between documents, none of the advances in LAR algorithms of the web can be made to apply. The ranking in these systems is still limited to TFIDF style algorithms of full-text search and result in lower quality. Even recent rich indexing approaches such as using keyword-based categories in the upcoming Microsoft Windows Vista operating system will still suffer from the same problems of previous IR systems—it is estimated that a person searching for a document based on a keyword is likely to use the same keyword as the one on the document only 20% of the times. This results in the paradoxical situation that it is easier to find a document on the Internet than to find it on one's own hard disk.

Recently, there has been interesting work done in the area of categorization through a sharing method called Folksonomy. Unlike the early attempts of Yahoo! and ODP to manually categorize the web in a centralized fashion, they attempt use a collaborative tagging approach to share bookmarks, pictures and web pages. Major innovators in this space include Flickr, del.icio.us and Technorati. Although each approach to tagging is different, all of them attempt to use keywords as the basis for creating a shared space for users. Yet overall only a small number of users actually use Folksonomies. This is partly due to the fact that they are more difficult to use than search, and also because the coverage of pages in a Folksonomy is a small fraction of the available pages. Unlike search that can automatically crawl the web or disk to index all documents, there exists no comparable mechanism that can bring pages efficiently into a Folksonomy.

A similar set of problems exist with blogs and messaging systems in general. Blogs are an attempt to create a "read-write" web where a user is not just a consumer of information but may post content online as well. The real promise of blogs may only be realized when the blog post published by someone can reach out to potentially interested readers in an efficient manner. What is required is the opposite of search where instead of a person searching for relevant blog postings, blog postings need to search for relevant people. There is currently no way to achieve this. The situation is worse in other messaging systems such as email. While email and IM are efficient mechanisms for one-to-one interaction, they do not efficiently handle the notion of sending an email to a topic. Distribution lists are the closest proxy to a mailing on a topic but it is not possible to create one dynamically and assign people to them. Often times the only way to communicate the existence of a document to others is email. This leads to abuse of such distribution lists and inboxes becomes swamped with mail that is less relevant to the user and results in information overload and loss.

Organizations in general, whether they are Corporations, Government, Non-Government, Military or Religious, have become larger and more complex. As such organizations grow in size, it becomes more and more difficult for people to get to know each other and often the organizations gets divided into silos where the "left-hand" does not know what the "right-hand" is doing. This is a major issue when organizations are confronted with a rapidly changing environment and where different parts of the organization must be made to work together dynamically to take advantage of an opportunity or to face a threat. Traditional organization structures like hierarchies and departments with point-to-point communication like telephones or email, do not allow for the flexibility to make effective response. A context-based communication and collaboration mechanism can play an important role. A paradigm that allows people to congregate based on a specific context such as a new opportunity/threat and to dissipate when it is over, will enable the creation of a more organic approach to organization that is more responsive to change. The basic metaphor of web search, where the creator of a web page and the final user need not know each other to "collaborate", may be extended to communication and collaboration so as to allow organizations to manage complexity.

Basic Concepts Behind the Invention

This invention attempts to provide a solution by defining the problem in terms of communication and collaboration. It focuses on creating systems and methods that allow i) the creation of a generalized annotation-based collaboration system such that advances in Information Retrieval may be applied, ii) a method for clustering users and items, and iii) a communication method that allows people to publish and subscribe messages based on context. There may be multiple features in these mechanisms that are novel to the art. These methods may be used in conjunction with each other or other systems as well as stand-alone.

A Generalized Annotation-Based Collaboration System with IR

There are many forms of annotation-based sharing systems known to the art. All Folksonomies are examples of such systems. However, annotation systems differ in their effectiveness in terms of sharing and collaboration. Microsoft Windows NTFS file system has always had the ability to add keywords to any file but this has not been used in practice primarily because such keywords could not be used to find files efficiently. Technorati Tags, a technology that allows bloggers to tag their posts such that people may discover it, is less effective because only the author can tag the item. Flickr is a photo sharing site that allows users to share their photos with other people. However users have limited use for others' photos once they have seen it, so the dynamic in Flickr is less about collaboration and more about sharing.

Del.icio.us, however, is an example of a successful collaboration system with regards to bookmarks. Since one's bookmarks could potentially have independent value to other people, the act of sharing it assumes a more significant role than say Flickr. Since different people may be faced with a similar problem, sharing of relevant information that helps in solving it acquires a collaborative dimension. Apart from the intrinsic value of bookmarks, del.icio.us also differs from others Folksonomies in terms of its mechanism. It allows multiple users to tag the same item and multiple users do tag the same item as they independently derive usefulness from doing so.

It is known in the art that many aspects of the Web exhibit power laws. A power law is a distribution that forms a straight line when plotted in a log-log graph such as FIG. 2. This is considered to be a fundamental indicator of being fractal and accounts for scale invariance (the distribution looks self-similar at any scale). Power laws have been noted in the contents of web pages, hyperlinks between web pages, search queries, file sizes on web servers, traffic patterns and even the physical wires making up the Internet. Power laws in the hyperlinks between pages allow LAR algorithms like PageRank and HITS to converge to a solution effectively and therefore become practical methods. Words used in the content of a document also follow a power law, also known as Zipf's Law. This is implicitly leveraged by IR ranking methods such TF-IDF (Term Frequency-Inverse Document Frequency) and others to sort search results by relevance. Del.icio.us also exhibits power laws such as FIG. 1. The keyword frequency in an item, the number of items to keywords, the number of items to users, the number of users to items and others all follow power law distributions. This invention notes that the distribution of keywords to items in del.icio.us is similar to the distribution of keywords to queries at web search engines (as indeed are link text in the web). The distribution of users per item is similar to the distribution of in-links (hyperlinks coming in to a web page) on the World Wide Web. In fact, although hyperlinks on the Web are normally considered as a form of page navigation this invention notes that they may also be considered as a form of annotation.

This invention posits that these power law properties are properties of language itself and the way we perceive usefulness in the items around us. This is a necessary outcome of the two mutually reinforcing processes of communication and collaboration. Thus any annotation system that can suitably leverage the emergent self-organization occurring in these processes will exhibit similar power law characteristics that can be advantageously leveraged by the existing body of IR and LAR research.

Using this basic insight, the invention generalizes the notion of an annotation system in at least two important ways. Annotation is not merely considered to be the act of a user tagging an item with keywords, but any act that requires the user to describe an item in a succinct fashion. The clickstream in a search is at least one other equivalent method for annotation. It also generates annotations such that the keywords of the query are associated to the URL clicked for a given user. Link text in hyperlinks on the web is also another mechanism for such annotation albeit less expressive. Placing a file in a file system hierarchy is a form of annotation albeit more rigid and limited and is similar to associating all the names of directories in the hierarchy tree above the file with it. While link text and file names are not as efficient as tagging or clickstream, in large enough numbers they approximate the effect of an annotation of the form of the invention.

Secondly, annotations can be applied to any item that can be identified within the communication and collaboration activities of a group. This is not just limited to web URLs but can encompass anything that can be conceptualized. This can include but is not limited to files in an Enterprise LAN, tasks and issues in a project management system, ideas in a brainstorming session, paper documents, a table on a spreadsheet, data in a RDB, a web service, RSS feeds, etc. Assuming there exists a mechanism (offline or online, digital or otherwise) to allow the user to retrieve or use the item, an item can be anything that can be represented by a unique id (like a URI, Social Security Number or Bar Code).

The generalized annotation-based collaboration system of this invention is defined as any annotation system that contains a multitude of items where i) the system allows an item to be identified and shared (such that it can be retrieved, evaluated, viewed or used) by a multitude of users independently of each other; ii) where each such user can independently annotate items with keywords that they feel are useful in describing the item and each such item is potentially annotated by a multitude of such users (i.e. each item can have independent value to different users); iii) and where each user can independently find items based on such keywords such that all items with the corresponding keywords (aggregated across the multiple users for each item) are retrieved; will exhibit self-organizing properties that approximate power law distributions for a sufficiently diverse population of users and items. The key notion here is that of independence, which implies that users can operate without knowledge of each other's activities and/or existence. This means that the only mechanism for organization of items between users is the shared meaning of keywords among the different users.

More specifically, annotation may be generated by any mechanism that produces events of the form:
[Item ID] [User ID] [Keyword 1, Keyword 2, . . . Keyword N]
each time a user with a unique identifier [User ID] describes an item with a unique identifier [Item ID] with the keywords [Keyword 1, Keyword 2 . . . Keyword N] that describe the item. This invention notes that if such an annotation-based system exhibits approximate power law distributions in:

the number of items to a keyword
the keyword frequency within an item
the number of users to an item
the number of items to a user then such a mechanism displays the following properties:

It is possible to use TFIDF style ranking in sorting search results for relevance. Each item may be represented by a keyword vector similar to ordinary documents in IR. Furthermore, similar to link text on the web, each annotation represents a different person's judgment of the contents of the item and when aggregated is better at describing the contents than even the author/creator of the item. Thus, ranking based on aggregated keywords often-times yields superior quality compared to standard full-text searches.

It is possible to treat each event as a "synthetic" hyperlink from a user to an item. By treating users as hubs and items as authorities, it is possible to incorporate IR algorithms like LAR methods (as described in Borodin, et al.) like HITS, Hilltop, SALSA, PHITS, randomized HITS, subspace HITS, TOPHITS, CubeSVD and others in determining the result sets and ranking of search results. The result quality delivered by such an approach may equal and sometimes better their current performance based on hyperlinks in the web. Since both user-to-items and item-to-users display power laws, these algorithms will converge rapidly like the web. This can allow annotated items to benefit from LAR style approaches where it is not currently possible such as files in the Enterprise.

When a user annotates an item with a set of keywords, of the large number of ways to describe an item, a normal user naturally chooses keywords that they find useful in defining the item. In doing so the user not only describes the item but at the same time describes what they find important. This makes it possible to query for users by keywords similar to documents. Ranking of users to a query may be done either by any of the above IR approaches including LAR algorithms treating a user as a hub.

The community annotates the different keywords with which a person may potentially search for an item/user more effectively than any individual. However, it is also possible to use LSI or PLSA by using a keyword-item or keyword-user matrix in a fashion similar to the word-document matrices to allow querying for items or users by keywords even if no annotation specifically associates them with the keyword. These leverage higher order co-occurrence data to discover such words. This may be further enhanced by using three-level approaches like PHITS+PLSA, HOSVD, CubeSVD and TOPHITS on the event data.

It will be evident to a person skilled in the art that based on the above; numerous search methods based on IR are possible for items as well as users in such an annotation system. Whether they are used selectively or in conjunction with each other in a specific embodiment does not deviate from the spirit of this invention. Furthermore, it is always possible to construct annotation keyword vectors for an item/user, keyword-item and keyword-user matrices, and treat annotations as synthetic hyperlinks regardless of whether the annotation system exhibits power laws. All the above methods may be applied in any such case but potentially with lower effectiveness.

Clustering of Items and Users

There have been attempts in the past to create methods for clustering documents. Taxonomies and Controlled Vocabularies have been tried and failed because it is not practical to create one super-structure such that all items may be effectively put into it. Attempts have been made to use clustering on the result data based on textual similarity but the sub-categories generated by such automated methods often times are not easy for a user to understand.

This invention extends the notion of clustering to items in general and search in particular. An ability to drill-down into search results with ever-narrowing contexts is a possible solution to the problem in web search where the average query length is 2.3 keywords. The modern user is accustomed to drilling down into folders in a file system to find the file they seek. Therefore, if search results were clustered into sub-categories by keyword (e.g. FIG. 10) the user may exhibit a browse behavior similar to a file system. This would be the equivalent of augmenting the original query with the keyword corresponding to such sub-categories. This would be more user-friendly and potentially superior to query refinement methods such as Google Suggest. Such a method is not limited to web search but may be applied to any form of search including but not limited to Desktop Search and Enterprise Search.

Apart from clustering items, there are many potential uses for clustering users. This may be to create dynamic formations of special interest groups or the creation of social networks based on interests rather than being based on familiarity, etc. The generalized annotation mechanism of this invention allows treating users similar to items with respect to keyword. There are many clustering algorithms that are known in the art that may be used to cluster items as well as users. These include projection methods like Principal Component Analysis and Multidimensional scaling or other methods like Self-Organizing Maps, K-Means clustering, and others. Items may clustered based on the keywords used in their annotations or the users who annotate them or both. Users in a similar fashion may be clustered based on their keywords or items or both.

One of the key problems that all clustering methods need to solve is complexity reduction. As an example, there is considerable complexity associated with the keywords of an item as well as a user. In practice, there may be as many unique annotation contexts as there are items. Therefore the clustering problem becomes choosing a subset of relevant keywords that serve the purpose of bringing together similar items and users. This is a hard problem due to, among other things, the extremely large number of combinations possible and the difficulty in determining the relevance of keywords to items as well as users. Also, unlike items, users have many facets that change over time and can share many keywords.

Pattern recognition methods such LSI use dimensional reduction as a method to deal with this complexity but they are expensive to perform and keep updated, as well as it is difficult to understand what it is they are actually doing.

This invention notes that the most relevant clustering occurs when both users and items are simultaneously clustered. This invention exposes an approach that achieves significant complexity reduction and delivers intuitive and effective clustering results for both users and items. It is based on the notion of context. Context is defined here as a set of keywords. In the case of search, the context would correspond to a search based on a logical AND of the keywords. Items or users are considered to belong to a context if they match against all the keywords of the context. A sub-context of a context is one which has all the keywords of the context as well as at least one other keyword. Therefore, all the users and items present in a sub-context are also present in the context. The set of Keywords in an annotation event is a context (The annotation event itself can be considered to be a context if one extends the definition of Keyword to include UserID and ItemID, in which case, the annotation event is a sub-context to the context formed by the set of Keywords. Also, users may be considered as Items.).

Clustering of items and users can then be defined as determining the set of contexts that are most relevant to bring together users and items. Complexity reduction may be achieved when the size of such set of contexts is much smaller than the set of all contexts in the system. This invention uses the intuition that a relevant/useful context is one that is used. Therefore, such a set of contexts may be determined from actual contexts in annotation events used by users in describing items and by finding the contexts that contain at least certain minimum numbers of items and users. In practice, for an annotation system with a sufficiently diverse user/item population, even small minimum numbers can lead to significant dimensional reduction and efficient clustering of users/Items along interest based categories. This overcomes one of the main problems of implementing forums—it is difficult to decide what topics are meaningful to the users so that they can communicate effectively. The emergent contexts or topics of this invention give rise to a dynamic and relevant clustering to users and items that provides a solution to this problem.

In the case of search including web search, annotations can be acquired from query logs based on the clickstream of search results (they may also be advantageously combined with link text where such links come from different web hosts or blogs or other proxies for independent annotators and other annotation sources). The set of contexts as defined above can be computed and referred to as category contexts. For any given context in the search, the set of contexts in the category contexts that are sub-contexts of the search query can be computed and each of the keywords (after taking out the keywords of the search context) in the resulting set can be offered as a drill-down subcategory as described above. Drilling down a given sub-category is the equivalent to changing the context of the query so that it includes the keyword corresponding to the drill-down subcategory. Therefore, each drill-down keyword corresponds to a sub-context of the context of the query. This is not limited to single word keywords but encompasses co-locations and n-gram based word sequences that can be taken as a drill-down keyword. These drill-down keywords may be presented sorted based on a specific ranking order. Such ranking order can be computed from the number of events (or users or items; as well as the numbers may be calculated based on a time horizon such as "today" as well as accumulated totals) for such sub-contexts. Furthermore, calculation of category contexts itself may be done in a time-bound manner where all the events in a given time window are used for calculating the category contexts.

The actual search process during drill-down can be independent from the annotations used in computing such drill-downs and can be whatever method the search engine uses for performing search including full-text search, etc. The role of the subcategories is merely to present relevant keywords to the user that is then used to augment the search query.

A Context-Based Communication Method

Communication is the backbone of all collaborative activity. Yet most communication technology today is limited to one-to-one paradigms (like telephone, email, SMS/IM, etc.) or one-to-many paradigms (like TV, radio, Web, etc.). There is an important class of communication that is not adequately catered in the state of art: many-to-many communication. By many-to-many what is implied is not multiple people as in the case of conference calls or multiple recipients for email. Instead, like the one-to-many case, the recipients are not known to the sender of a message prior to the communication. As an example, someone placing a file in an Enterprise file system needs to be able to communicate its existence to the potentially unknown people who may require it. Blogs allow anyone to post content on the Web but there is no effective mechanism that allows the target web user to discover the blog posting.

The problem may be articulated as "For each item its users; and for each user their items". Search allows people to find relevant items but what is perhaps more important from a communication and collaboration perspective is the ability for items to find relevant people. The methods described above can be advantageously used to solve this problem.

A many-to-many communication system may be implemented as two separate parts: a publisher of an item that needs to search for users that would find the item relevant and a user searching all items for the ones relevant to them. It will be apparent to those in the art that any such mechanism must balance needs for inclusiveness, relevance and privacy in order to create a practical implementation.

This invention divides the communication process into three stages: publishing, contextualizing and subscribing. It uses a context-based approach to publishing where the publisher needs to choose the most relevant context for the item in question to reach the desired subscribers. This context is preferably limited to the category contexts of the annotation system as described above. The publisher can disclose a publicly available form of identity along with the item. This may be done by using a Publisher ID that is unique to the publisher (that may or may not be the same as the publisher's User ID) and annotating the item with this id. The act of publishing can be made into an explicit act that generates a special type of annotation event called a publishing annotation event or could be a normal annotation event that appends the Publisher ID to the item.

Subscribers periodically get (pull) items based on the contexts from the set of category contexts that the user has indicated or shown interest in the past. Such subscribed items can then be "personalized" or re-ranked based on the match between the keywords of the items and the keywords that the user has used in past annotations for the context. This can be advantageously augmented by computing the match between the Publisher IDs of the document with the Publisher IDs of items that the user has found useful (or annotated) in the past. The Publisher ID serves as a distributed form of reputation for the publisher. A subscriber that has annotated (such as selected or bookmarked) items from a publisher in the past can have future items from the same publisher ranked higher after re-ranking in personalization. Correspondingly, if a publisher has received relatively less annotation from a user in the past, future items from the publisher will be ranked lower. To complete the feedback loop, the annotation events may be implemented differently from normal search where the user annotating an item can have the Publisher ID they recognize automatically included in their annotation. These annotation events can be aggregated and allow for ranking publishers in a context just as one would rank items.

Contextualizing is a process where an item that is published for the first time in a particular context is pushed down to a subset of the users in that context. This subset of users serves as a pilot group for the item and they annotate it with keywords if they feel it appropriate. These annotation events are aggregated and the annotated item is then made available to all context subscribers. The contextualization phase may be limited to a pre-determined time window, a minimum limit to the rate at which the item acquires annotations or any other suitable metric.

This process accelerates the process of take up of an item in certain situations. This allows for the item to receive a certain minimum level of annotation to sufficiently categorize it for future searches or subscription. This may be advantageously used to introduce a new item to influential publishers for a context who can promote the item and help rapid acceptance if they feel the item relevant and appropriate. Contextualization is an optional step that implementations can implement if they derive value from doing so.

There are a number of reasons to model a system along these lines as discussed below. One major reason is end-user privacy. In some cases such as Enterprise workgroups, searching for users by keyword may be acceptable or even desirable (such as "Find an Expert"). In such a case, a person may contact the searched person directly by telephone or email. But in many situations the user may not want their contact information or personal details to be disclosed. In these situations, a similar purpose may be achieved by the sender publicly disclosing their identity but blindly sending a message to users in a context and such users may reply based on their individual judgments. By limiting the sender to a single (or possibly a small number of contexts) makes the sender focus on selecting the right group of people to send the message. This is an important aspect of human judgment that is missing in Information Filtering as well as search where automated processes collect items.

By having publicly disclosed identities, items may be ranked for searches as well as subscription based on their Publisher IDs as well. This enables authors to build a reputation among subscribers based on the value that end users have perceived in their posts. It is also a mechanism for accountability for publishers. Widely regarded authors will have a vested interest to protect their reputation by publishing only high quality items. If they fail to do so, unknowingly or on purpose, they will cease to be widely regarded. Since reputation takes time to build, a widely regarded author has little to gain and much to lose by promoting low quality items. This is a distributed form of reputation that is hard to spam and such authors can add an important new dimension to Information Retrieval algorithms than what may be discernible from either link analysis or the synthetic hyperlinks of annotation based analysis. Essentially, it includes an element of expert judgment into the ranking process. Thus, implementations may choose to incorporate both annotation information per item as well as Publisher ID information in computing the overall ranking of items within a context.

The contextualizing phase is important for an item to quickly get annotated with the right set of keywords. As noted before, the ability of a community to contextualize an item exceeds that of any individual. It has been seen in communities like del.icio.us that the distribution of keywords in an item follows a power law. The number of keywords annotated by more than a predefined percentage of users is often relatively stable and shows scale invariance with respect to the number of events beyond a certain threshold. These top keywords are called the defining characteristics/keywords of an item may be captured relatively quickly if the item is exposed to users in a context sensitive fashion such as Contextualization. The defining characteristics reasonably represent the community's judgment of the context of the item and allow subscription to be more relevant and accurate.

Contextualization is also important for new items to get recognized quickly. An item from a lesser known publisher can be sent in targeted fashion to widely regarded publishers for the context and if they find value in the item, they can publish it with their identity (essentially append their identity to the item along with the original author). This will allow for rapid take up within the overall population for a new item. This will also allow promising new talent to receive rapid exposure.

The community's ability to process items in a context can increase based on the number of users in the context. Every person does not need to process every item. Items may be divided among subsets of the community and contextualized in a parallel fashion. Category contexts represent a meaningful locus for such collaboration to take place. As an example, there are in excess of 5 billion pages indexed in Google and more than 100 billion emails per day (unfortunately inclusive of spam). It may be possible for a suitable implementation of this communication mechanism to contextualize a domain of the size of the entire Web within a reasonable period of time. For a generalized annotation mechanism, this communication method represents a practical alternative to the role of spiders in web search. In addition, general context level statistics may be made available to senders allowing them to find appropriate contexts. Such statistics can include but is not limited to, the number of users and items in the context. If the ratio of users to items is higher than average, this may be a good indicator of a hot topic. If the ratio is much lower than the average, then the sender may decide that the context is too competitive for his/her message. This gives an important feedback loop that may affect content generation on the Web or more generally, how any collaborative organization wishes to allocate resources to tasks.

Annotation continues even after the initial contextualization process and the item continues to be described over time by different people with different keywords. The contextualization phase may contribute to an initial screening of items such that relevant or promising items are brought to the fore. Further annotation allows for further characterization of the item through a more relevant set of defining keywords. Keywords in the defining characteristics for items may change (exhibit churn behavior) with respect to time as the community characterizes the usefulness of an item in different ways over time. The overall process of annotation can be likened to sending the item over a Small World network where the destination user is unknown and each user passes it to other users through new contexts based on their judgment of relevance of the item to the context. Effectively, the semantic network of context associations is both created by and mirrors the social network of interactions based on such contexts. Category contexts represent highly connected hubs in such a network that allow for efficient communication of items between users.

The subscription process allows items aggregated at the context level to be periodically retrieved based on user interests. User interest in a context may be explicitly specified by the user or implicitly derived based on the user's annotations, clickstream or usage patterns of items within the subscription process. Explicit specification of user interest is the equivalent of persisting a query for a certain context and continuously retrieving items for it in the background. However unlike the search process, explicit specification of user interest in subscription is unlikely to be a practical method. At any given instant of time, there may be many items in many contexts potentially relevant to the user that the user may not be aware of. The implicit goal of such a subscription system is to facilitate discovery of such items. This invention uses a form of personalization that profiles a user based on annotation events to infer interests.

There are many approaches to personalization known to the art. This invention introduces three aspects that are important in achieving adequate personalization—category contexts, Publisher IDs and a time-based variant of TFIDF for re-ranking. Most user profiling based approach to personalization attempts to rank items based on keywords that the user has found valuable in the past. However, such an approach misses important new domains of interest and keeps reinforcing a limited set of keywords to the detriment of user experience. By using category contexts, it is possible to introduce an element of serendipity based on what the community finds interesting. Such serendipitous items typically introduce the user to unanticipated new domains and facilitates for discovery of relevant new domains of interests for a user profile. This can be captured implicitly in the annotation events (such as clicking) of such new items as well as explicitly by the user performing searches in such new contexts because of reading/using the item.

The subscription process considers each category context to be an independent source of items that it subscribes from. Subscription retrieves items from all category contexts in the user's profile. This may be done by distributing such retrieval based on the distribution of interest. As an example, if we assume that the user has a limited attention span (such as a certain maximum number of items per day), then the number of items retrieved from a context may be in the same ratio to the total items retrieved as the ratio of the amount of attention that user spends in that particular context (like number of items read/retrieved, etc.) versus the total. The calculation of this distribution may also be restricted to a given time window during which the user is profiled.

The user profile in the form of distribution of interest across different context categories may be presented on demand to the user for their inspection. The user can delete or update such ratios in a variety of metaphors to allow for fine tuning of their preferences. However, as it may not be readily apparent to the user what a change to a certain ratio will mean, an embodiment may merely allow the user to specify or de-specify category contexts that will continuously be downloaded from regardless of the actual user usage. It may also allow a user to remove/delete any category context from the profile.

There needs to be a balance between such collaborative rankings with what the user finds relevant. This invention introduces a time-based variant of the TF-IDF approach for re-ranking based on user profiles in order to determine relevance for a particular user. For a particular user in a particular context, keywords and their actual usage frequency are derived from annotation events for that context. In order to compute a temporal usage frequency, the number of uses of the keyword and the time interval from the time the user first used that keyword in that context is measured. This frequency is extrapolated to the frequency to a pre-determined time period to give what this invention calls the temporal usage frequency. As an example, for a given keyword, the user has used it twice in the two days since its first use. This would give a temporal usage frequency of 365 times per year. This temporal usage frequency is damped by using a log value of the frequency as is common with TF-IDF style approaches and is used as weights for the keyword vector of user interests in the context. The weights of keyword vectors in the items can be done in the traditional TF-IDF fashion and the rank (match) of the item to the context for this user may be computed in the normal fashion as a dot product of the two vectors. Items are re-ranked within the context based on such computed ranks.

A profile of user interests as described above contains sensitive personal data. Therefore, it is likely that the user will feel more comfortable with a client-side implementation on their PC with full access to see what is stored and alter it, than with such information being managed on a central server. This, however, means that for a given context, it may not be possible to perform the re-ranking over the entire set of items corresponding to a context without downloading a large amount of data to the client side. Alternatively, even on a centralized server, computing such personalized re-ranking may be too expensive to perform or may not be desirable as the collaborative ranking of the context community may be lost. A balance between these objectives is obtained by restricting the re-ranking to a subset of the top collaboratively ranked results in the context. This may be achieved by pulling from a context only a number of items from the context, and re-ranking these results based on the user profile. This number would allow for control of the mix between collaborative ranking and personalization.

A rate based calculation like the time-based variant of TF-IDF can be advantageously applied with the Publisher ID to efficient detection of interesting authors. Unlike ordinary keywords that can potentially have a constant flow of a large numbers of items, most authors produce a relatively smaller number of items. If the Publisher ID is treated like a keyword in the keyword vector for the item, then even the normal TF-IDF like method will give a higher weight to the Publisher ID than other keywords. This can be suitably augmented by using the temporal usage frequency of the user for the Publisher ID. As an example, let us say Publisher A has published 2 blog posts overall, and a user has read both of the publisher's posts in the past 2 days since the user encountered the Publisher ID. Let us say another Publisher B has 20 blog posts of which the user has read all 20 in the past year. Publisher A will be ranked higher than Publisher B for a new item. However, if the user does not read subsequent items by Publisher A or Publisher A does not produce subsequent items, then the ranking would decay over time. This method ensures that Publisher IDs which have proved useful in the recent past will be ranked higher initially but allow for other publishers who consistently produce useful items to overtake publishers who do not.

Similar time-based TF-IDF approach can be used to rank category contexts in the drill-down categories of the system. Essentially, the user's actual use of the context as well as its recency may be suitably incorporated into the ranking process and not just the cumulative number of events in the context or the cumulative number for a given time window.

BRIEF SUMMARY OF THE INVENTION

According to a broad concept of the present invention, the present invention provides a method for collaboration, the method comprising: identifying a plurality of items with unique identifiers that can be shared among a plurality of users with unique identifiers; having each user annotate a plurality of such items, with at least one keyword in at least one natural language, independently of other users, each such item being annotated by at least one user, each such annotation being represented by an annotation event which contains the identifier of the annotating user, the identifier of the item being annotated, and the at least one keyword that the annotating user chooses to describe the item being annotated, each such annotation event being generated from a plurality of event sources of at least one type; aggregating such annotation events from a plurality of event sources such that the keywords associated with a specific item are aggregated from the annotation events for the item as well as the keywords associated with a specific user are aggregated from the annotation events for the user; and having at least one such user search for items or users by keywords such that corresponding items or users respectively, that have the searched keywords in their aggregated keywords are returned as results.

Embodiments of the present invention provide systems and methods allowing users to annotate multiple items independently of each other such that each item is potentially annotated by multiple users and each user can search for items based on item keywords that are aggregated across the multiple annotations of the item. As used herein, the term "annotation" refers generally to any succinct description of the item such that keywords are collected from a user and thereafter stored in association with an identifier of that user. The item can correspond to any item that can be identified with a unique identifier (including files in a file system, paper documents, tasks and issues in a process management system, ideas stored in a repository, etc.). In embodiments of the present invention, annotations may be collected in various methods including publishing, tagging, clicking a result in a set of search results, directory and file names from a file system path, hyperlink text, etc.

The present invention may further comprise ranking the search results based on relevance to the query for each event source type separately; aggregating such ranks to compute the final rank of each result; and aggregating results across all event source types to present the final results in order of relevance.

In one embodiment, the result set of the search is ranked by using Information Retrieval algorithms like TF-IDF. In another aspect of this invention, each annotation is considered to be the equivalent of a hyperlink and determining of the result set as well as ranking the result set based on a Link Analysis Ranking algorithm. In another aspect, for every annotation, each user is considered a Hub and each item is considered an Authority and the results and ranking are determined by Link Analysis Algorithms such as HITS, etc. As an example, through such a method items other than web pages such as files in an Enterprise file share, etc. may benefit from the greater accuracy commonly associated with the web search.

In another embodiment, the present invention the annotations are processed to enable context based clustering of users and items. Annotations are grouped according to keyword based contexts such that contexts having more than a certain pre-defined number of users and pre-defined number of items represent clusters of both users and items simultaneously. This is used to augment the search process by offering drill-down categories for a search result. As an example, a web search engine may collect annotations from its clickstream logs and use the following clustering method to categorize results and offer potential query modifications that allow the user to further narrow the results in a meaningful manner.

In another embodiment of this invention, it is possible to search for users based on keywords. This may be done by using either aggregated keywords of the user's annotations or through using a Link Analysis Ranking like HITS, BFS or INDEGREE as described above. The ranking of users to the query can be achieved in a similar fashion to items as described previously.

In another embodiment of this invention, it is possible for a user to communicate with other users in a context-based fashion through publishing and subscribing. In publishing, the user introduces a new item to the system by annotating it with a context and a publisher identifier. Other users may find such items through searching or by subscribing. Subscribing refers to automatically searching and retrieving the top results based on contexts that the user has found useful in the past and presenting them in a personalized manner. Such contexts may be explicitly specified by the user or monitored based on the user's annotations. In one aspect of this invention, personalization is achieved through re-ranking a subset of the top ranked subscribed items with a time-based alternative of TF-IDF. In another aspect of this embodiment, the subscription may be limited to items within a specified time window. In another aspect of this embodiment, both publishing and subscribing may be limited to contexts that represent clusters of users and items.

In another embodiment, publishing is made into an explicit act with the publisher identifier used as the basis of ranking items in a personalized fashion at each subscriber. This allows publishers to acquire a distributed reputation based on take up across the user population and a highly ranked publisher has a vested interest in publishing high quality items. This creates a form of expert judgment that can be leveraged with item ranking.

According to another aspect of the present invention, the method further comprises clustering both items and users simultaneously by context; aggregating annotation events by contexts; determining contexts that have a predefined minimum number of unique user identifiers and a predefined minimum number of unique item identifiers in their aggregated annotation events; and clustering items and users based on such contexts. The method further comprises clustering the result set of item or users based on using a clustering algorithm and presenting the clusters as sub-categories for the search results. The clustering may be achieved based on a method from a group consisting of LSA, K-means, Self-Organizing maps, Principal Component Analysis, Multidimensional scaling and Projection methods. The clustering may be performed on the basis of at least one data type from a group consisting of keywords, item identifiers, and user identifiers.

According to yet another aspect of the present invention, the defining keywords for an item are calculated from the aggregated keywords of the item such that they correspond to the set of keywords that are used by more than a certain percentage of the annotating population. These sets of defining keywords are used as the basis for determining machine representation of meaning, concepts and their semantic relationships. The semantic relationships may be computed with at least one method from a group consisting of pattern recognition methods and correlation analysis methods such as LSA, and the ontologies may be represented in a Knowledge Representation format. The ontologies may be represented in a format which is one of a group consisting of RDF, OWL, Entity-Relationship diagram, Relational Database Schema, Object-Oriented Class, XML and a table. The method further comprises a filtering method where items from a result set may be removed if specific keywords are present in their defining keywords.

BRIEF DESCRIPTION OF THE DRAWINGS

Now the present invention is described in the following with reference to the appended drawings, in which:

FIG. 1 is a diagram showing a typical annotation distribution;

FIG. 2 shows graphs showing a power law distribution;

FIG. 3 is a diagram showing a basic system design according to the present invention;

FIG. 4 is an exemplary computing environment;

FIG. 5 is a view of a user interface for a browser based annotation event generator;

FIG. 6 is a view of a user interface for a file system based annotation event generator;

FIG. 7 is a view of a user interface for an Email software based annotation event generator;

FIG. 8 is an exemplary remember dialog;

FIG. 9 is an exemplary publish dialog;

FIG. 10 is a view of a user interface for an annotation browser;

FIG. 11 is a flowchart showing the process of annotation aggregation;

FIG. 12 is a flowchart showing the process of search and personalization;

FIG. 13 is a flowchart showing the process of publish and subscribe;

FIG. 14 is an exemplary remember annotation event;

FIG. 15 is a subscription ClickStream annotation event; and

FIG. 16 is an exemplary publishing event;

DETAILED DESCRIPTION OF THE PREFERRED EMBODIMENTS

Computing Environment

FIG. 3 illustrates a general overview of a generalized annotation system. Such a system comprises a client system 110 that can connect to networks such as an Intranet LAN/WAN 140 as well as potentially connects to the Internet 150 either directly or over the LAN. Such a client system 110 may be used to access, receive, retrieve and display content such as web pages from the Internet 150 as well as Intranet content such as files and emails from a LAN 140. The content servers 180 may be servers available on the web such as web servers or application servers that can serve content to the client system 110. There are many types of servers available in Intranet LANs that could potentially serve content to the client system 110, such as Mail Servers 184, File Servers 183, Database Servers 182, as well as many custom-built and package software applications housed in servers 181. The client system 110 could also potentially connect to content servers through other kinds of networks such as an extranet, a virtual private network (VPN), a non-TCP/IP based network or the like.

The client system 110 can be implemented in a general-purpose computing device such as FIG. 4 in the form of a conventional personal computer 201, which includes processing unit 202, system memory 203, and system bus 204 that couples the system memory and other system components to processing unit 202. System bus 204 may be any of several types, including a memory bus or memory controller, a peripheral bus, and a local bus, and may use any of a variety of bus structures. System memory 203 includes read-only memory (ROM) 205 and random-access memory (RAM) 206. A basic input/output system (BIOS) 207, stored in ROM 205, contains the basic routines that transfer information between components of a personal computer 201. BIOS 205 also contains start-up routines for the system. Personal computer 201 further includes hard disk drive 208 for reading from and writing to a hard disk (not shown), magnetic disk drive 209 for reading from and writing to a removable magnetic disk 210, and optical disk drive 211 for reading from and writing to a removable optical disk 212 such as a CD-ROM or other optical medium. Hard disk drive 208, magnetic disk drive 209, and optical disk drive 211 are connected to system bus 204 by a hard-disk drive interface 213, a magnetic-disk drive interface 214, and an optical-drive interface 215, respectively. The drives and their associated computer-readable media provide nonvolatile storage of computer-readable instructions, data structures, program modules and other data for personal computer 201. Other types of computer-readable media which stores data accessible by a computer may also be used in the operating environment.

Program modules may be stored on the hard disk, magnetic disk 210, optical disk 212, ROM 205 and RAM 206. Program modules may include operating system 216, one or more application programs 217, other program modules 218, and program data 219. A user may enter commands and information into personal computer 201 through input devices such as a keyboard 222 and a pointing device 221. Other input devices (not shown) may include a microphone, joystick, game pad, satellite dish, scanner, or the like. These and other input devices are often connected to the processing unit 202 through a serial-port interface 220 coupled to system bus 204; but they may be connected through other interfaces, such as a parallel port, a game port, or a universal serial bus (USB). A monitor 228 or other display device also connects to system bus 204 via an interface such as a video adapter 223. A video camera or other video source is coupled to video adapter 223 for providing video images for video conferencing and other applications, which may be processed and further transmitted by personal computer 201. In further embodiments, a separate video card may be provided for accepting signals from multiple devices, including satellite broadcast encoded images. In addition to the monitor, personal computers typically include other peripheral output devices (not shown) such as speakers and printers.

Personal computer 201 may operate in a networked environment using logical connections to one or more remote computers such as remote computer 229. Remote computer 229 may be another personal computer, a server, a router, a network PC, a peer device, or other common network node. It typically includes many or all of the components described above in connection with personal computer 201. The logical connections depicted in FIG. 4 include local area network (LAN) 227 and a wide-area network (WAN) 226.

When placed in a LAN networking environment, PC 201 connects to local network 227 through a network interface or adapter 224. When used in a WAN networking environment such as the Internet, PC 201 typically includes modem 225 or other means for establishing communications over network 226. Modem 225 may be internal or external to PC 201, and connects to system bus 204 via serial-port interface 220. In a networked environment, program modules, such as those comprising Microsoft Word which are depicted as residing within 201 or portions thereof may be stored in remote storage device 230.

The client system 110 could also include a desktop personal computer, workstation, laptop, personal digital assistant (PDA), cell phone, or any WAP-enabled device or any other computing device capable of interfacing directly or indirectly to the Internet. Client system 110 can run inside a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like.

The server system 120 corresponds to an annotation server within an Intranet environment and the server system 130 corresponds to an annotation server on the Internet 150 that can service clients from across the web. The server system 120 services client systems by receiving annotation events, aggregating events and process search and subscription requests from the clients. This may be implemented on a PC device such as described above or a server configuration such as UNIX servers from Sun Microsystems, Linux-based and Windows-based Intel servers, and the like.

Software may be designed using many different methods, including C, C++, Java, C#, VisualBasic, scripting languages such as PERL or TCL. Aspects of the client system can be developed for browser based delivery such as HTML, XML, Java, JavaScript, ActiveX, etc. code, or any other suitable scripting language (e.g., VBScript). In some embodiments, no code is downloaded to client system 110 and needed code is executed by a server, or code already present at client system 110 is executed.

The invention may be practiced with other computer-system configurations, including hand-held devices, multiprocessor systems, microprocessor-based programmable consumer electronics, network PCs, minicomputers, engineering workstations, mainframe computers, and the like. The invention may be implemented in digital electronic circuitry, or in computer hardware, firmware, software, or in combinations of them. Suitable processors include, by way of example, both general and special purpose microprocessors. Any of the foregoing may be supplemented by, or incorporated in, specially-designed ASICs (application-specific integrated circuits).

Annotation

As explained above, annotation refers to any succinct description of an item by a user such that keywords may be derived that describe the item according to the user's judgment. This is emitted in the form of events for each occurrence of such annotation. A sample of the data elements contained in an event is shown in XML form in FIG. 14. Such events may be generated in multiple ways from multiple event sources and event source types. The preferred embodiment achieves this with the notion of an event generator 112. These event generators may be in the form of Toolbars, Add-ins, shared libraries, OS level support and the like. Each event source type has its own event generator. There may also be multiple event generators for each event source type. Although the preferred embodiment acquires keywords directly from user interaction, they may also be obtained by using an automated procedure against the full-text of emails and documents of the user. Also, the specification of a keyword for a mail message or document may be done by the user in text in a manner similar to specifying text to be underlined. A person skilled in the art will recognize that there are numerous ways in which such keywords may be obtained from the user.

As an example, browser-based annotating events may be generated from a Toolbar Add-in to the browser such as FIG. 5. File system based events may be generated from an Explorer Add-in such as FIG. 6. Each event generator 112 can describe itself through EventSourceID and EventSourceLabel elements that it can place in annotation events. Annotation events for Web pages in browser may be designated with a different Event Source than file system based annotation events of a Corporate LAN. Such events can be communicated to one or more annotation servers on a private network such as a LAN or can be communicated to one or more annotation servers on the Internet, based on the event generator 112.

Annotation events include the Item ID for the item being annotated and User ID for the annotating user. For greatest accuracy, a unique item should correspond to the same unique Item ID and a unique user should correspond to the same unique User ID, across events from all Event Sources. However, the preferred embodiment leaves the implementation to determine the best way to achieve this goal as per the requirements of the implementation. This is done because there is advantage gained from integrating with disparate event generators even though User IDs and Item IDs do not accurately conform to the above requirement. The aggregation value may outweigh accuracy in many cases where there is a suitably diverse population of items and users. As an example, the same page on the Web may have multiple URLs (essentially multiple Item IDs). But in many cases finding just one of them is sufficient. Search engines like Google attempt to aggregate such URLs for the ease of the user, but the basic structure of the Web does not mandate such aggregation or uniqueness.

In the preferred embodiment, the item can be any thing that can be identified by a unique Item ID given by a URI. This can naturally include web content using URLs as is commonly found in Folksonomies. This can also include files and folders in a file system, email messages at a mail server, as well as include physical objects such as paper documents with bar codes, tasks/issues in a project management system that have a unique id, ideas in a brainstorming session stored in text form in an application with a URI, etc. There are numerous methods known in the art to generate such unique Item IDs and they may be utilized as per the requirements of the implementation. The preferred embodiment allows the user to optionally specify a Title and a Description for the item that is included in the annotation event, similar to the way an email allows a Subject and Body. This is stored along with the Item ID as in FIG. 14. The preferred embodiment allows a user to specify a title and description during a "Remember" dialog annotation event which is stored locally for the user. This can be used in displaying the item in the "My Items" option of an annotation browser window such as FIG. 10, and allows the user to customize the description of the item. A publisher must specify the title and description of the item if the item is new to the system; otherwise the "Publish" dialog such as in FIG. 9 pre-fills this information from the item information stored at the server. The Clickstream annotation events do not specify the title and description information. Other embodiments can handle this in a number of different ways such as updating the item information in the server with the latest title and description information, etc. Some embodiments may digitally sign annotation events with a key based on the user to allow for authentication and non-repudiation if required.

As an example, FIGS. 5, 6, and 7 show an approach to integrating event generators 112 in the form of a Toolbar. Toolbars are programs that serve as Add-ins into existing applications such as web browsers, file system explorer and email applications. This is known in the art and there are currently many examples such as Toolbars from MSN, Yahoo! and Google. The toolbar has a "Remember" button and a "Publish" button. The "Remember" button allows the user to annotate an item by launching the Remember Dialog window as in FIG. 8 and the "Publish" button allows the user to publish an item by launching the Publish Dialog window as in FIG. 9. FIG. 5, shows that a Toolbar in a web browser can allow the user to annotate the currently displayed URL through the "Remember" button or publish the item to the system with the "Publish" button. Such a toolbar may also allow the user to right-click any hyperlink in the displayed page and choose a menu item that launches the Remember or Publish Dialog window. Furthermore, if a user searches for pages using the search in the Toolbar and clicks one of the URLs returned in the results, the Toolbar can monitor such user activity and automatically generate an event using the keywords used in the search against the item such as FIG. 15. This may be augmented with further user monitoring such as evaluating whether the user reads the pages clicked or even how far the user reads the page, before determining the event generated. This invention functions best when the events generated from unique users are aggregated. Therefore, the assigning of a User ID to the annotating user is required. This may be accomplished for an Internet based annotation server by dynamically assigning the user with a unique ID that is stored as a cookie or making the user login to the server before annotation. The browser based event generator may send all its annotation events to such an Intranet server but may optionally send events generated on pages of the public web to an Internet based annotation server. The User ID is represented in the form of an URI In FIG. 6, a similar set of metaphors may be used in the case of a file system. Just as in the browser case, any file or folder can be annotated using either the "Remember" or "Publish" button. Right-clicking an item can give a context menu item to access the same functionality as the buttons. Searches performed on file system items may be annotated in the background as above. UserID information may be advantageously acquired from the Operating System in certain situations such as a user logged in to an Intranet LAN. Such events may be sent only to an Intranet based annotation server for reasons such as security and privacy.

FIG. 7 shows the same concepts being applied to email software such as Microsoft Outlook. Any email may be annotated with keywords as above. Similarly, it is possible for the File-Save and File-Open Dialog boxes to be augmented with the ability to annotate or publish files with keywords and search for files based on keywords. A person skilled in the art will recognize that there numerous ways in which such functionality may be implemented within any given application. As an example, the Toolbar or the OS may offer an API that allows a custom built application to launch the Remember dialog window for any item. Such a custom built application may have its own event source identification and may pre-fill the Item ID as per its own requirement.

Therefore, for the purposes of the description, all annotation events are assumed to be created by event generators 112 (in FIG. 3) like the above Toolbars. These event generators 112 can have unique Event Source identifiers added to the event by the generator. For example, a Toolbar annotating email may add the Event Source ID as http://www.abc.tld/Email and a Label as "ABC Company Email". In order to prevent namespace collision in the Event Source ID, the preferred embodiment uses a URI based syntax. However, the responsibility for ensuring uniqueness is left to the implementation.

The User ID of the user may be determined by the event generator 112 in a number of ways as per the requirements of the implementation. This may be acquired by having the user login to an annotation server using a userid (such as an email id) and a password thereby allowing the annotation server to generate a unique User ID, or it may use the Operating System's login information, Federated Identity solutions, Single Sign-on data or it may automatically generate a unique ID and keep it as a cookie in a browser.

In some embodiments, it is possible to have other form of annotation event generators in the form of crawlers. A web crawler 170 is well known in the art and is used by search engines to get pages on the web for indexing. Such a crawler may be used to find hyperlinks between web pages and generate annotation events. The link text may be used instead of keywords and the web host or blog information can be used instead of a userid. This generates events that may be of inferior quality compared to the Remember Dialog or the clickstream described previously because link text is typically useful in determining fewer relevant keywords and it is not easy to identify independent sources of judgment (the actual users creating the hyperlink). Technorati's rel="tag" style tags may be used for generating annotation events for a page. This, however, is also limited as only the author of the page can assign such tags.

In other embodiments, it is also possible to create an Intranet-based crawler 160, where all the files in a file system, mails in a Mail Server or other data types can be annotated automatically. As an example, a file system crawler can scan the entire file system including personal and shared drives. Such crawlers are known to the art and are similar to programs that index files in a Desktop Search software. Such a program can be modified to use the directory and file labels in a directory path as keywords to a file. This can compute a unique hash based on the contents of the file (such as a cryptographic hash) and find the same file in different users' personal folders and, generate different events for the same file using the different userids and the different keyword sets. However, there are limitations in such a method compared to the annotation mechanism where a user directly annotates a file. These can include files with misleading names like "Stuff", emails and other forms of data with little or no relevant information, etc. Thus, such a crawler may also use automatic annotation methods that generate keywords based on content of the items. The preferred method of incorporating items into an annotation server will be to use the publish and subscribe paradigm described in detail later.

Aggregation

Annotation events are aggregated to deliver the functionality of this invention. This is somewhat similar to indexing of documents in Information Retrieval. In document indexing, an inverted index of words is created where each word is mapped to the documents it occurred in. In this invention events are aggregated into three separate mappings—map each User ID to its events, map each Item ID to its events, and map each context to its events. Context here refers to a set of keywords consisting of at least one keyword. There are many indexing or hashing methods known in the art that may be leveraged to achieve this mapping and it is not necessary to describe in detail such a process. For reference, one such method is found in the paper "MapReduce: Simplified Data Processing on Large Clusters" by Dean, et al. of Google, Inc.

First, all events are mapped for the user. This implies that all events with the same User ID are available at the same data structure. This is done for event normalization as well as user profiling. The user based mapping may be done in the client system 110 or at the server system 120, depending on the requirements of the implementation. The preferred embodiment uses user based mapping at the client system 110 as it is potentially more desirable with respect to privacy, security, and using the computing power at the edge of the network. This may be achieved with a software resident on the client system 110 that receives events (step 300) from all event generators 112 and stores them locally of a persistent store like 111.

Most Folksonomies and other annotation methods assume that a user annotates an item just once. However, in a generalized annotation mechanism such as the one of this invention, a user can annotate the same item multiple times. This may be due to annotating/using the item in different contexts or using it in different event generators. All the annotation events for a given item are aggregated at the user-based mapping and the set of events that represent unique contexts for each event generator is computed and called the raw events. This set of raw events are then normalized (steps 310 or 405 in FIG. 11). Normalization refers to accumulating all the keywords and their usage counts for an item for each user and dividing by the total keyword usage for the item for the user. As an example, if a user uses 2 keywords for an item—say Keyword1 and Keyword2. The total number of times the user uses Keyword1 for the item is 3 and Keyword2 is 7. Then, after normalization, the Keyword1 count would be $3/(3+7)=0.3$ and similarly, the Keyword2 count would be 0.7. At the end of normalization, a normalized event is produced for a given item for a specific user. Normalization may be performed per Event Source or across all events per item as required by the implementation. There are potentially numerous ways to normalize events but the preferred embodiment normalizes across all event sources and ensures that each user gets effectively one keyword "vote" per item when aggregating keywords per item.

Such a normalized event and its corresponding raw events are sent (step 320) to the relevant annotation servers such as an Intranet based server like 120 or an Internet based server like 130. This is done in an incremental fashion and only when there is a change of state. The choice of which servers to send the normalized event can be based on the item. If the item is a public asset like an Internet web page, then the event maybe communicated to both Internet and Intranet based annotation servers. If the item is an Intranet document, then the event may be sent only to the Intranet based server. There may also be multiple Internet or Intranet servers that the client system 110 can communicate the event to. This information can be saved as a configuration profile in the client system 110. In step 400 in FIG. 11, the events are added to each store at the annotation server. In step 401, the aggregator module 132 can detect whether the event should be placed in a time based store by evaluating whether the item is new to the system or the item is new for the context (step 402) in which case it is added, otherwise it is not. In step 403, if the user data is hosted at the server, then the event data is added to the user map (step 404).

The events are then received at the annotation servers such as 120 or 130 by the aggregator module 122 or 132. The normalized events are mapped first based on the item (step 406). This means that all events corresponding to a particular Item ID are aggregated to the same data structure. As these are normalized events, each item will have at most one event from a particular User ID. The keyword counts are aggregated by keyword from all users that have annotated the item. The total keyword count will equal the number of users or effectively the number of independent sources of judgment that have annotated the item. As noted before, the keyword distribution roughly approximates a power law distribution. This means that the number of keywords used by more than a certain fraction of the number of users annotating the item will be approximately constant and scale invariant with respect to the number of annotation events. As an example, if the number of keywords used by more than 5% of the annotating population for the item will be roughly constant regardless of whether the item has received 50 annotations or 500. The keywords used by a suitable percentage of users, depending on the needs of the implementation such as 5% or 10% can be considered to be the defining characteristics or keywords of the item. The defining keywords are a group description that emerges from annotation aggregation, and are a reliable guide to assigning the item to topics implicit in these keywords. The defining keywords for an item are updated (step 407) as above based on the event. It should be noted that the keywords in the defining set do exhibit churn behavior, i.e. different words may enter and leave the defining set over time.

The aggregator module then maps the raw events based on context. A context may be a single keyword or a set of two or more keywords. Events that have all the keywords of the context in them are considered to be part of the context. Therefore, mapping an event to a context 408, allows one to aggregate all the events part of a context in a single data structure. In practice, there could easily be as many unique contexts as there are items or more. As noted before, this invention uses the notion of category contexts to reduce the complexity of the context space and allow for simultaneous clustering of both users and items. In the preferred embodiment, category contexts are calculated from raw (not normalized annotation events) and correspond to contexts that have a certain minimum numbers of unique items and users. Some embodiments may further restrict the definition of category contexts to those that have a certain minimum number of items, all of which are annotated by a certain minimum number of users. Some embodiments may prefer to use normalized events for computing category contexts. Others may use raw events but restrict the raw events sent to the server such that only one event is sent for each unique context for the item and the user.

Category contexts can be generatively computed as events are received (step 408). One can begin by aggregating events based on unique keywords. As events are accumulated in certain keywords, these may be hashed once again by removing the original keyword and getting a second set of unique keywords, each of which represents a context of itself and the original keyword. This can continue recursively to generate category contexts as each context fulfills the predetermined criteria for a category context. In the preferred embodiment, this method is augmented further by two more restrictions so as to prevent topic drift. Only the keywords that correspond to the defining keywords of the item are used to determine whether the event is a part of the context. As well as category contexts that have event rates lower than a certain level are removed from being category contexts (or a caching mechanism that keeps only the most recently used may be employed). The above restrictions are rather stringent requirements that may make more sense in a large scale implementation. These may be relaxed in at least the following ways for an implementation that does not gain value from such restrictions:

- all the received events are used for the computation
- events that contain the keywords of the context even if they do not correspond to defining keywords for the item
- events that contain the keywords of the context where at least one such keyword corresponds to the defining keyword for the item
- by determining users and items that correspond to the context based on their aggregated keywords respectively instead of using events
- by determining items based on keywords of the context and determining the users that annotated such items
- by determining the users based on keywords of the context and determining the items that they annotated.

Furthermore, to the preferred embodiment creates "synthetic" category contexts. Contexts may be considered to form a Directed Acyclic Graph (or DAG). As an example, a context of Keyword1 AND Keyword2 (Keyword1+Keyword2) represents items that are a subset of the items corresponding to Keyword1 as well as the items corresponding to Keyword2. It is possible to consider Keyword1 as well as Keyword2 individually are parents to the context of Keyword1+Keyword2. If Keyword1+Keyword2 is a category context, then to the preferred embodiment will "synthesize" its parent contexts as category contexts as well (even though they may not qualify as such based on aggregating their events based on the predetermined criteria).

The preferred embodiment aggregates events based on category contexts. This is done generatively such that as a context becomes a category context, the event data is managed separately from its parent context. This allows for a separate calculation of user and item ranking for each category context as well as treats each one as separate destination for publishing and subscribing. This may be done in a lazy fashion and events may be aggregated for a category context only when required such as a search query or a publish/subscribe request is received for it.

Those skilled in the art will appreciate that the implementation of insert, update and delete of annotation events across the different elements of annotation aggregation will depend on the requirements of each implementation, however it is relatively straightforward to implement such that it adheres to the basic aggregation requirements as described above. The aggregated annotation data can be stored in a number of different methods such as in a search engine index such as Lucene or in a Relational Database. The events may be aggregated in real-time or in a batch mode that is conducted at a pre-determined interval or in response to actions from the user such as search queries. The exact method may be determined based on the requirements of a specific implementation and its choice does not alter the basic intent of the invention. Certain event source types may yield better ranking results in some situation than others. As an example, depending on the implementation, events from the "Remember" dialog may yield a better indication of a user's interests than others. Therefore, an embodiment may have aggregation data structures that allow for separate ranking and other computation based on such source types, if required. Final ranks can be computed based on aggregation of ranks from different event source types.

Search

A user may initiate a search by sending keywords (step 500) into a search module 114 in the client system 110. This may be done in a number of ways. As an example, the search field in the Toolbar of FIGS. 5, 6, and 7. The user may launch a dedicated annotation browser window as in FIG. 10 and type into the search field. There can be many ways of implementing this as long as they communicate the query string to the search module 114. The search is typically in the form of keywords and follows the same format as searches common in search engines on the web. The query effectively represents a context as described above.

After the user has initiated the search by entering in the keywords under step 500, in step 501, the hits from item based aggregated events are obtained. The search response module 123 or 133 at the server is responsible for determining matching items or users (hits) and determining relevance of such hits (ranking). A core innovation in this invention is the recognition of the ability to use Information Retrieval techniques in the ranking of hits based on annotation. This includes traditional TF-IDF style approaches (as described in "Modern Information Retrieval: A brief overview" by Amit Singhal) as well as LAR style approaches (as described in "Link Analysis Ranking Algorithms, Theory, and Experiments" by Borodin, et al.). If the query context corresponds to a category context, LAR style approaches are the preferred form of ranking. As noted before, it is possible to incorporate LAR style approaches by using each annotation as a synthetic link between a user and an item. In general, both users and items may be considered as nodes in a graph with directed links going from users to items. More specifically, this allows the user to be treated like a hub and an item as an authority in link analysis algorithms.

The preferred embodiment does not allow the querying user to search for users based on keywords due to privacy concerns and creates a publish/subscribe method in its replacement. Essentially, it does not allow to return user information as a search result but allows a person to send a message to relevant people (as determined by a user based search done at the server) without the people having to reveal their private information and give the option to such people to get back to the sender or not. This is restricted to category contexts. In step 503, the hits are obtained from context based aggregated events.

In the preferred embodiment, category contexts are ranked 504 based on the HITS algorithm. Any LAR algorithm such as the ones described may be used. This field has been extensively researched and there are many variants that are targeted at various deficiencies. The preferred embodiment uses the events part of the category context as the initial set. As noted before, these events are selected such that all the keywords of the context are present and they correspond to defining keywords for the item. This is done to resolve the topic drift problem commonly associated with the HITS algorithm. These events are used to generate synthetic links between users and items and the HITS algorithm is applied to it. This gives ranks for both users in the form of hub ranks and items in the form of authority ranks. These ranks can be computed at generation time (step 408) for the category contexts and kept updated as events are aggregated (step 409). Ranking of users and items based on a query for a category context can be advantageously done by using these ranks. The ranking of the user may be done with a different algorithm than the ranking of the item. As an example, the item may be ranked with the HITS algorithm while the user may be ranked with the BFS algorithm as described in Borodin et. al.

The contexts that are not category contexts, the preferred embodiment utilizes a simple TF-IDF based ranking (step 502) based on the normalized events in the item based mapping of events. Other embodiments that allow the search of users may generate hits based on aggregated keywords per user. If the context keywords are present in the aggregated keywords, then the user may be returned as a hit (step 505). Such a mechanism can employ a TF-IDF style mechanism for ranking (step 506) or any of the other methods applicable from IR.

In order to facilitate quick query response, such hit and ranking information for both users and items may be stored in inverted indices in a traditional search engine such as Lucene, or may be stored within a Relational Database such as Oracle.

In other embodiments, it is also possible to rank Publisher Ds in a category context in a similar fashion to items. Each item can potentially have a number of Publisher IDs. Each of these IDs can be associated to users with a synthetic link in a fashion similar to the item. A given Publisher ID's associated users are aggregated across all items. Users are modeled as hubs and Publisher IDs are modeled as authorities. The same algorithm for ranking items may be used for ranking Publisher IDs. These ranks are indicative of the level of authority that the publisher has among users within the context. Ranking is also possible in contexts that are not category contexts, but sparsity of the data may make a TF-IDF style approach, a tensor decomposition approach such as CubeSVD, LSI, or PLSA and PHITS, etc. a superior alternative. Ranking of items may also be based in part on the ranking of its Publisher IDs and such ranks can be aggregated in computing the final rank of an item for the query.

There is a basic difference between users and items with respect to ranking. Items typically exhibit a power law behavior that allows for the determination of the defining characteristics of the item. This makes TF-IDF style approaches effective in discriminating relevance as it can leverage the keyword counts in the aggregated normalized events. Users, on the other hand, tend to have many more facets than items and such facets change over time. LAR style approaches or tensor decomposition methods such as CubeSVD may make for a superior alternative than TF-IDF approaches in given implementation. As a person skilled in the art will note, there are many variations possible in the applying of IR techniques. Different embodiments may choose to implement different IR techniques for ranking as per their requirements. This will not deviate from the basic intent of this mechanism.

The result of the search also returns further drill down categories (steps 502, 504 and 506). These are effectively suggestions of relevant keywords for further augmenting the query. The preferred embodiment calculates the drill-down categories from category contexts. Specifically, this means that for all category contexts that are children of the query context, remove the keywords of the query context, generate the next level of unique keywords, sort them by their cumulative event count and return the top (e.g. 20) keywords. Certain embodiments may calculate these from keywords of the items corresponding to the context. Others may use the clickstream of searches as the basis for calculation. Some embodiments may prefer to use "recent" event counts that correspond to cumulative figures for these counts in given time interval. As noted before, some embodiments may also use a time-based TF-IDF approach based on the user's temporal usage frequency of the category context in order to get a better personalized set of drill-down categories.

Many other approaches to ranking may be used in unison with the above. As an example, for text content full-text indexing may be used to augment ranking based on annotations. For web pages, hyperlink connectivity may be leveraged by traditional LAR approaches. All these different sources of ranking for an item or a user can be advantageously aggregated with a number of rank aggregation algorithms known to the art that can be selected based on the requirements of the implementation.

The results and categories are then returned from search response module 133 to the client system 110 and then displayed to the user (step 508) using the display module 113. These results can be displayed in a dedicated window such as the annotation browser of FIG. 10. Other data may be augmented in the search results such as the total number of users and items in the queried context. Some embodiments may provide a list of Event Sources types or event sources that correspond to the hits that may also be used for query specification (essentially treating them like category contexts).

Personalization, Subscription, and Publishing

An undesirable result of searching and returning search results based on all events is that power laws exhibit a "rich get richer" phenomenon where the top ranked hits for a context start getting saturated by a few items, etc. and it is progressively more difficult for new entrants to gain visibility. This is detrimental to the usefulness of the entire system and essentially makes the ecosystem of interactions implode to just a few participants. This may be somewhat ameliorated by using a time-based approach. As an example, events may be aggregated for a time window (such as the last hour or today or this week, etc.) separate from the entire aggregation as described above. This allows recent events to get better exposure.

FIG. 10 shows an annotation browser that can display such time-based results in the "Latest" tab. From a display perspective, the client system 110 needs to be enabled for processing such time-based changing of results. Most time-based systems currently like email typically sort messages by the time they are received. This may not be possible if there are large numbers of such messages as would be the case in this system. Therefore, the "Latest" tab needs to display items based on relevance. This requires a change in the basic user interface metaphor as the user will no longer be able to keep track of what they have seen and efficiently find what they have not seen (such as going sequentially down a list as in emails). This can be done by implementing a metaphor where items already seen by the user can be kept in a separate list called "My Items". This can be accessed by selecting the "My Items" menu item in a combo box while in the "Latest" tab. This will display all items that the user has seen, annotated, published, etc. in the time window given by "Latest". "My Items" will also have a similar meaning when selecting the "All" tab but will include all items regardless of the time window.

Such functionality needs to differentiate between a truly new item and a new event on an existing item. Popular items are annotated continuously as new users find them. The aggregator module 132 can detect whether the event should be placed in such a time based store (step 402) by evaluating whether the item is new to the system or the item is new for the context, in which case it is added, otherwise it is not. Alternatively, some embodiments may signal an event on an item as a new one if one has not been received on it for a given time window or the rate of events for the item has dropped below a prescribed rate.

This will allow the default "Latest" tab window to focus on presenting the latest and most relevant items at all times. This can be sorted by relevance at any time and continuously. This display metaphor can be augmented by other paradigms such as a ticker tape of new items on the desktop or alert messages above the System Tray when items of high relevance are received, etc.

This time based approach is advantageously augmented with a Publish and Subscribe mechanism that allows for targeted delivery of content with the aim of enhancing discoverability of new and relevant content. This is achieved by leveraging the following mechanisms:

- Using category contexts to allow publishers and subscribers to congregate
- By allowing the publisher to choose the most relevant context for an item
- By making publishing an explicit act with accountability
- By having a contextualization phase that allows for rapid processing by a community in a distributed fashion
- By having a personalized subscription process that allows for a distributed form of reputation for publishers Items can be introduced into the system through publishing. In publishing, the publisher assigns an item to a category context such as in FIG. 9 and then publishes it to the system. Fundamentally, publishing is a form of annotation. In the preferred embodiment, publishing is made into an explicit act separate from annotations. This can be accomplished by pressing the "Publish" button as in FIG. 5, 6, 7. Publisher needs to authenticate (step 600) to the system with a userid and password. When verified, the system assigns the publisher a unique Publisher ID that is used with all the published items of the publisher. This may or may not be the same as the User ID of the publisher depending on the requirements of the implementation. The publisher then assigns the item to a unique category context (step 601) that they feel is most relevant to the item. This is determined by the judgment of the publisher but can be aided by the fact that the publisher can see the items of the intended category contexts as well as the total user and item numbers. If the intended category context has relatively a much larger number of users than items, it may indicate a context where there is considerable interest in items and if the item is relevant, it will have a greater chance to gaining acceptance. If the context has relatively a larger number of items compared to users, then it is likely that the item will need to compete with others for the attention of users in the context and the publisher can decide to use it or another context depending on their judgment of the item's relative utility compared to the other items.

Once the publisher publishes the item (e.g. by pressing the publish button in FIG. 9), the item is sent to the server system (120 or 130) in the form of a publishing event. A sample of such a publishing event is shown in FIG. 16 in XML format. The publishing event is similar to an annotation event except that it necessarily includes the unique Publisher ID of the publisher of the event. An existing item may be published by any publisher and not just the original publisher who first introduced the item into the system. This is merely the equivalent of adding the new Publisher ID to the item. Each such publish event is processed in a similar fashion to other annotation events with respect to normalization as well as item and context mapping (step 602). The Publisher IDs are not used in the normalization calculation for keywords as this would skew the description of keywords. However, the Publisher ID is a metadata for the item and can be aggregated at the item level across all such annotation. These IDs are not included in determining the defining keywords for the item, but may be included in the results from a search (step 502, 504, and 506) to allow the user to re-rank items based on their familiarity with the publisher. The Publisher ID allows for a distributed form of reputation (or accountability) for the publisher with their subscribers.

If the item is new to the context or new to the server system (120 or 130), then the preferred embodiment attempts to contextualize (step 603) the item. This is a process where the item is pushed to a set of users that is, potentially, a subset of the users in the category context. Such users can be determined by the server system by using ranking methods to determine the top users for the context, or can include influential publishers for the context, or can be a random subset of the users of the context, or in other ways depending on the requirements of the implementation including sending the item to all users in the context. Such a pushing mechanism for a particular user can be implemented by the server through the subscription process. Essentially, a subscriber pulls items from the server from time to time. The server uses the User ID of the subscriber to determine whether to add the item for contextualization to the results for the user or not. Until an item is contextualized, it is not available for the users to download as a part of the normal subscription process. The primary purpose of contextualization is to allow for a small but representative group of people to annotate using the "Remember" button or publish using the "Publish" items that they feel are relevant in a quick fashion such that it may get speedier take up by the community of the context (a higher ranking for searches and subscription), as well as allow the item to determine both its defining keywords as well as other such keywords that others may use to search for the item. This process can be accelerated if influential publishers are included in the subset of users for the context. A person skilled in the art will note that the contextualization process is merely to speed up acceptance and useful in contexts with high traffic but is not a necessary condition. This step may be omitted if the context has a low level of traffic or other situations where the overhead of this process does not deliver commensurate value.

One issue with search is that the user needs to specify the context they are interested in to retrieve results. This is not an efficient way for a user to discover relevant items as they become available. The preferred embodiment uses the subscription process 114 to retrieve relevant items in an automated fashion and displayed 113 to the "Latest" tab in FIG. 10 and presented based in decreasing relevance order and the relevant category contexts as drill down categories (as explained above). Such contexts can include globally useful contexts such as "Most Read", "Most Recent" or the like, as well as those based on a user's profile of interests. The subscription process creates a user profile based on category contexts. This can be done both explicitly as well as implicitly. A user may specify category contexts that they are interested in explicitly in the form of a persisted query so that items from them are downloaded continuously in the background. This is also done implicitly by observing the user's relative frequency of annotation events for each category context (by clicking, etc.) and retrieving items in that proportion. The preferred embodiment uses annotation events from all event source types to compute these ratios. In other embodiments, annotation events from different Event Sources types may be weighted differently as per the implementation requirements. For example, an annotation event from the "Remember" dialog may be considered to be more indicative of user's interest than an annotation event from a click stream and therefore may be weighted higher.

In order to preserve the user's privacy, the preferred embodiment stores this profile in the client system 110, such that the user retains full control of their profile and may view or edit it as they wish. The client system 110 can retrieve items based on category contexts anonymously but in order for the contextualization process to work, the subscription process 114 requires the user to authenticate to the system (step 610) with a userid/password based login process in order for the profile for the user to be retrieved. Some embodiments can use this form of a push process for other purposes apart from contextualization such as the delivery of targeted advertisements.

The handling of drill-down categories in the "Latest" tab, unlike that for normal search which is over the entire collection of items in the "All" tab, is adjusted against both the time window used for events as well as time-based TF-IDF based on the user's temporal usage frequency of the category context. Essentially, the ranking of such drill-down categories reflect the cumulative event count of the time window as well as the user's usage and recency of usage. This allows the user to easily discover the recent "hot" and relevant topics.

To increase relevance of items presented to the user, the subscription process 114 personalizes the items before displaying 113 to the user. There are many approaches to personalization known in the art but effectiveness of such approaches is still not well understood. The preferred embodiment takes the approach of retrieving top ranked items at the server system (120 or 130) for a context and then re-ranking the items at the client system 110 based on the user profile. This has a number of characteristics that are advantageously leveraged such as enhanced privacy and security, leveraging both collaborative and content-based ranking (server and client based ranking respectively), as well as using computing power on the edge of the network. Items are downloaded (step 611) to the client based on the user's profile. This can be done by sampling the number of items a user typically reads/uses in a given time period like a day, and then taking a suitable multiple of that number and distributing it across the contexts in the user's profile. As an example, the user reads 150 items per day and 10% of all such reads are in the context "Ajax". The subscription system may download 15,000 items during the day such that 10% of the items correspond to the keyword "Ajax" or as many as is available, whichever is smaller. These ratios may be recomputed in real-time as the user interacts with the system or in a batch fashion after a pre-determined interval such as once a day. The multiple allows a mix between order based on ranking at the server (which is a proxy for the community's opinion of relevance for the item) and ranking at the client (which is determined on the basis of the user's interest). A suitable multiple may be calculated per user or per context or even set by the user in an interactive fashion through a visual metaphor like a slider control.

The items downloaded from the server for each such context is re-ranked (step 612) based on the user's profile. This is achieved by comparing the keyword vector of the user profile for the context with the keyword vector of each item. The preferred embodiment determines the keyword vector of the context from user profile and the keyword vector of each item in a stringent fashion. Only those keywords that are a part of defining keywords for the items in the annotation events that are part of the context for the user are used to calculate the keyword vector (such events include all events in the profile and not based on the item to be re-ranked). Annotation events corresponding to the clickstream of the "My Items" tab are excluded from the calculation. The weights for this vector are calculated in time-based TF-IDF fashion as explained previously where the temporal usage frequency of the keyword for the user in that context is used as the weight for the keyword in the vector. Re-ranking is done by comparing the keyword vector of the user profile for the context with the keyword vector of each item. The keyword frequency for the item is determined from aggregated normalized events for the item. This is then multiplied by the Inverse Document Frequency as in traditional TF-IDF approaches with a log based damping: log(N/d) where N corresponds to the total number of items and d corresponds to the number of items with the keyword in it. Ranks are calculated for each item based on the dot product of keyword vector for the item with the keyword vector for the user in that context.

The above calculation is augmented with Publisher IDs in a fashion similar to keywords. Each such Publisher ID can be included in the keyword vectors and will affect the final rank produced by the dot product. Since Publisher IDs occur relatively infrequently compared to keywords, they will have a significant influence on the final weighting. It is important to note that the weighting effect of the Publisher ID is limited to the contexts that the user has found the publisher useful and highly ranked publisher in one context may have no impact on the ranking of items in another. Re-ranking is equivalent of sorting the items based on decreasing values of these computed ranks. As a reader skilled in the art will note, all the above conditions are strict restrictions and may be relaxed in numerous different ways as per the needs to the implementation. Implementations can relax the conditions for keywords of events being a part of the defining keywords for an item. Implementations may use all the defining keywords of an item regardless of whether the user used them in their annotations. Implementations may suitably damp the effect of Publisher ID on ranking depending on their needs, or not use Publisher ID in the ranking at all. There are numerous variations of TF-IDF like rankings that may be used. Production and consumption rates for items may be used as the basis of the calculation.

These are then displayed 613 on the "Latest" tab in FIG. 10 as discussed previously. For the annotation browser, searching in the "Latest" tab searches only the items based on a time window as opposed to searching for all items in the system. This is different from searches in the "All" tab that cover all the items known to the system.

The subscription display is also used to recognize Publisher IDs and communicate them back to the server. The preferred embodiment restricts the number of Publisher IDs allowed per item to a pre-determined number like 10 and stores the IDs with the item in publishing order up to that pre-determined number. The subscription downloads all known Publisher Ds for each item at the time of retrieving items. The subscription process stores all such Publisher IDs (essentially updates the usage for each such Publisher ID in the user profile) and uses that in the computation of re-ranking based on Publisher ID. These are used not only for re-ranking as noted above, but also the original Publisher ID of an item and the Publisher ID with the greatest match are added to the with annotation event from the user for the item. This is then communicated back (step 614) to the servers through the annotation aggregation methods discussed previously. This also updates (step 615) the user profile for the context. This closes the feedback loop with regards to Publisher ID and allows them to be ranked at the server side for future contextualization and other purposes. The best match Publisher ID gives the publisher familiar to the user to get credit for the annotation. The original Publisher ID is included so that the publisher who introduced the item to the system is given credit. A person skilled in the art will note that there a numerous different methods to implement such a feedback loop and will give different system characteristics that can be advantageously used against the requirements of a given implementation. However, these will not deviate from the basic intent of providing a feedback loop for Publisher IDs back to the central server. Certain embodiments may allow users to search for highly ranked publishers. Other embodiments may augment ranking of items by including ranking of the publishers for the item in evaluating search hits. Certain embodiments may use the User IDs for a given item in a similar fashion as the Publisher IDs as described above. It is possible for certain implementations to use re-ranking for search results 507 in a similar manner to subscription as above. Drill-down categories for search results may also be ranked according to a time window basis or user temporal usage frequency basis. The preferred embodiment keeps search results based purely on the total accumulated events at the server and are the same for all users who use it. Only subscription items are re-ranked. This is done so that it is possible for the user to see a purely group view of the data apart from their individual views. This allows at least one view into items that is shared across all users.

It is possible for the annotation system to receive large numbers of items for any given category context. The subscription process of retrieving items based on category context to the client may not be able to scale with such flows. The preferred embodiment retrieves a pre-determined number of the most relevant items of a context in a periodic basis. This implies that there may be many items that are not available at the client for re-ranking. However, at any given instant, the client is likely to have the most relevant items. Other embodiments may take variations to the approach where all items or even all events are retrieved and the client image of items for a time window is kept in sync with the server image, etc. The key statistics for the of keywords and Publisher IDs that are used in re-ranking is got from the server to the client. This is done at the time of subscription and is kept up to date in a periodic fashion. A similar method is used to get the defining keywords for an item as it changes. All such data may be retrieved in a fashion that piggy-backs on an actual request for information by a user such as search or could be maintained at regular intervals. All the user profile data may also be backed up to a server at regular intervals and/or be available from a network based store. This can be stored by an independent entity from the one managing the annotation servers. As a person skilled in the art will note, there are many system configurations that the above invention may be implemented in without changing the basic functionality of the above. The description implicitly assumes that annotation servers communicate with the client in a Client-Server Architecture. However, the annotation server processing may be distributed in a number of traditional ways such as load balancing, 3-tier architectures, RPC/Web service based approaches, Peer-to-peer approaches and the like. Since the processing is done on the basis of items and contexts, computing may be distributed based on hashing. In the case of items, each server may process only a subset of items that is determined in the basis of a Hash function. In the case of context based servers, processing may be assigned to servers based on context. A REST-like approach may be utilized such that it is possible to implement local cache servers to speed performance. Processing may also be distributed in at least one novel way for context-based servers. A DNS like approach may be used where processing is federated in hierarchical fashion across a number of servers based on context. As an example, all processing for events regarding the context "Programming" may be relayed to a server specializing in this context. Events for the context "Javascript Programming" may be sent to the server specializing in "Programming" and from there sent to further servers based on the context "Javascript Programming".

The preferred embodiment is merely an example system using the basic concepts of this invention and there numerous variations that are possible and will not deviate from the basic intent of the invention. The preferred embodiment can be extended to use Boolean logic expressions such as AND, OR and NOT for search contexts as is common in search engines. It is possible to create collaborative spam or inappropriate content filtering by implementing special purpose keywords like "Spam" or "Adult" or others. This may be presented to the user in the form of a button or in other suitable form. The filtering may be controlled at the client system by allowing the user to set a value for the keyword count of such keywords and both the subscription retrieval process as well as the re-ranking process can filter out any items with keywords counts for these keywords greater than the user specified amount. A possible variation on this theme is to filter out items if such keywords are defining keywords for the item. It is possible for an embodiment to treat publishing as a special item type instead of an annotation event on an existing item thereby allowing each such annotation to have a separate Item ID. This allows an annotation to refer to another in its meta-data and allows for the creation of chains of such annotations. This will allow for a forum-like functionality that allows for the creation of threads of conversation and allows these messages to the stored within the annotation server itself, instead of the format in the described preferred embodiment where the item is stored separate to the annotation server and publish event merely serves as a method for intimating its existence.

There are embodiments of this invention that may be used within existing software applications with minor adjustment to deliver significant new functionality.

In one such embodiment, the notion of category contexts may be advantageously incorporated In current web search engines by deriving them from Clickstream logs at such search engines. This may be easily added to any search engine and can play an important role in generating, queries with a greater average number of keywords. This might be a more effective way to achieving relevant results than current personalization approaches.

In another embodiment, email may be annotated with keyword-like contexts by using a specially designed mail server that accepts keywords as mail addresses. As an example, a keyword Key1 can be entered as Key1@specialServer.tld. An add-in module to an existing email client like Outlook can be modified to create an interaction paradigm that allows seamless entry of such keywords by auto-completing the mail address. This email may be sent to such addresses by using To:, CC: and BCC. This will allow the categorization of email without having to change the underlying protocol. Every time a mail is forwarded or replied, such annotation is made and the email id of the sender is used as the User ID of this system, etc. and all such annotation may be aggregated at the server. The add-in module in the front end can then offer other functionality of the preferred embodiment such as categorization of email into category contexts as well as search, etc. Another potential method is to use the text of the Subject line to derive keywords such that stop words are stripped out and the email now can be processed similar to messages of this invention.

The notion of re-ranking items based on a time-based variant of TF-IDF on the Publisher ID may be advantageously implemented in the email client software even today. The Publisher ID will be the sender email id of received emails in the Inbox. The mail software can monitor the user to see which emails from which senders are read by the user to calculate the temporal usage frequency for each sender. The number of emails received from a particular sender can serve as a proxy for the number of items associated with the sender id. The re-ranking function may be advantageously implemented in order to sort the user's inbox based on relevance.

A similar approach may also be advantageously leveraged to make blog postings, podcasts and any RSS feed based items discoverable in a context sensitive fashion for the general user population with suitably developed software. All such postings can be sent as publish events to a suitable annotation server, and RSS Reader software may be suitably modified to allow for subscription and annotation as described by the invention. Publisher IDs may be synthesized from RSS urls or may be assigned by a special login procedure at the annotation server.

A reader skilled in the art will note that this invention and the described embodiments can be applied in various forms to files in the enterprise or desktop, blogs on the web, and other suitable uses for this invention. Instant messaging software as well as chat software can use this to implement context-based real-time messaging. This invention also has particular relevance to the delivery of targeted advertising. Searching for users allows advertisements to be pushed in a targeted fashion to a user. This can be leveraged by Web Search Engine providers to offer new forms of advertisements that are push-based instead of the current keyword based ad model which is pull-based. Since the subscription increases the number of contexts that a user is exposed as compared to web search currently, it creates a correspondingly larger number of advertising opportunities with high relevance. As user profiles can be kept in the client, this may be leveraged in novel forms of advertisement delivery such as offering TV or Movie/Video with commercials that are streamed to the user in a personalized fashion that may allow for new models of content delivery where content is given for free like television, etc. This form of communication may be ideally suited for the delivery of classified advertisements where a many-to-many communication paradigm allows for targeted delivery of such ads at lower cost and higher efficiency. As an example, it is possible for a seller of a used camera to communicate to a potential buyer of a used camera through the use of corresponding category contexts.

The embodiments of this invention can advantageously leverage the semantic mechanisms provided in two patent applications by the same inventor—"System for semantically disambiguating text information" (U.S. patent application Ser. No. 10/954,964 and PCT/SG2005/000321) and "A method and system for organizing items" (PCT/SG2005/000320). The contents of these prior applications are incorporated in this application by reference. U.S. application Ser. No. 10/054,064 discloses a user interface method which allows text to be converted to a unique machine representation of meaning. Therefore, keywords like blog, blogs, weblog, etc. can be mapped to a single id that stands for the meaning "weblog". This allows annotation, search, subscription and other mechanisms of this invention to be more accurate. Instead of having items divided into three separate contexts by the above keywords making them more difficult to find, they are grouped into one context for easy recall and comparison. Since the mechanism of this invention can allow keywords from any language, it is also possible for such machine representations of meaning to be implemented in a cross-language fashion and achieve the same disambiguation. Application number PCT/SG2005/000320) discloses a Knowledge Representation method that allows such semantic metadata to be organized in the form of limited hierarchies through the "related-To" relationship. This may be advantageously leveraged to disambiguate contexts just as the method of U.S. application Ser. No. 10/054,064 disambiguates text. As an example, the following contexts effectively refer to the same set of items—{"Javascript", "Programming"} and {"Javascript"}. Essentially, since Javascript is a programming language, the majority of the items related to Javascript are also related to programming. Thus the keyword "Programming" adds no new information or discriminating ability to the set of items. By having two separate contexts, the context space is fragmented. This may be remedied by having a "related-To" relationship as described in the patent application going from "Javascript" to "Programming". This implies that for any item where "Javascript" is a keyword, the "Programming" keyword may be assumed to exist. By having such semantic relationships laid out beforehand, it is possible to disambiguate the two contexts to the same context. The patent application also describes a mechanism called "Browse Path Behaviour" that may be advantageously used with category contexts for drill-down keywords for more intuitive user experience. There are a number of other capabilities of these inventions as disclosed in both patent applications that may be advantageously combined with the mechanisms of the current invention.

The current invention can also serve as an important method for generating semantic metadata or concepts and their relationships. The defining keywords of an item in this invention may be utilized to generate candidate concepts. As an example, keywords that can be assigned to the same meaning can be generated (automatically or manually) by looking at similar words in the defining keywords for each item. Different keywords that have the same stem form can be automatically mapped to a common meaning (such as "blog" and "blogs" used in the same item would likely mean the same thing). With a bit of manual intervention it is possible to associate "weblog" to the same meaning if it is often used along with "blog" or "blogs" in the defining keywords of any given item. Similarly, keywords across different natural languages may be associated with the same meaning. As a more general method, it is possible to take the matrix of defining keywords and their corresponding items and perform correlation analysis such as LSI that will allow us to investigate correlation between word forms that includes co-occurrence as well as second, third or higher order co-occurrences to generate "related-To" relationships as well as the defining concepts and assigning their keywords. This is significantly different from other such attempts in IR. The defining keywords that are produced by the mechanism of this invention are a community's interpretation of meaning of words vis-à-vis real world items and are indicative of meaning in real usage. This gives a high quality data set from which pattern recognition methods such as LSI and others correlation methods may be used to derive semantic metadata and their relationships. Category contexts also represent a similar high quality data set that may be leveraged for such analysis to derive semantic metadata. Such metadata can be converted to the form required by the 2 patent applications for their functionality as well as such functionality can then be used to improve the accuracy of this invention.

Similar to the above, this may be extended to generating richer ontologies as defined by the Semantic Web by allowing annotators to specify relationships in the form of keywords such as "band=Beatles" and using a method similar to determining defining keywords to allow the discovery of property names of a given item/concept and using that to generate ontologies in an automated or semi-automated fashion.

A suitable embodiment of this invention may be used as a new method to augment process functionality within an organization. As an example, a person wishing to move his desk within an organization can merely publish a message to a context such as "Move Request" and all parties involved in handling move requests may subscribe to this topic and be informed simultaneously. These parties can include the authorizer of the request, facilities, technology, etc. Each of these parties can publish an item with the original Item ID as one if its keywords so as to allow chaining of such messages to the context of the original request. These published items can correspond to completion of steps in an organization workflow to process the request. As an example, such steps can include authorization of the request, notification of the request to other contexts, termination of the request, assigning of the request to another context and others. This can be augmented by strongly typing the published item with semantic metadata such as defining a "Move Request" semantic metadata and assigning it to the type of the item. In order to facilitate broader process functionality, this mechanism can be interfaced to an existing BPMS system. One of the key problems with process automation is that it is difficult to handle exceptional situations. The many-to-many communication paradigm such the one of this invention can help create a more organic and adaptable structure to such interactions.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

The invention claimed is:

1. A computer system for using an emergent self-organization characteristic in a natural language for establishing a collaborative content relevance between users and items in a context space, the computer system comprising:
    at least one processing unit and
    at least one computer-readable media for storing instructions for implementation by the at least one processing unit and data used by the at least one processing unit in implementing instructions,
    wherein the at least one processing unit includes:
    means for identifying a plurality of items in the context space with unique item identifiers, one of the plurality of items capable of being independently annotated in the context space by one or more of a plurality of users operating independently of one another without knowledge of each other's activities or existence, the annotating being done in the context space with unique user identifiers using an annotation of at least one keyword from the natural language during an annotation event, the annotation including an association between the at least one keyword, one of the unique item identifiers associated with the one of the plurality of items being independently annotated, and one of the unique user identifiers associated with the independently annotating one of the plurality of users;
    means for copying each of the annotations generated during ones of the annotation event to the at least one computer-readable media for storage therein, the stored annotations containing the ones of the unique user identifier of the independently annotating ones of the plurality of users, the ones of the unique item identifier of the ones of the items being independently annotated, and the at least one keyword, ones of the plurality of users capable of using a different keyword to annotate the same one of the plurality of items;
    means for aggregating the stored annotations based on a correlation between users, items and keywords to form the collaborative content relevance between the plurality of items and the plurality of users; and
    means for associating, using the collaborative content relevance, one of: ones of the plurality of users with other ones of the plurality of users; and ones of the plurality of items with ones of the plurality of users such that the ones of the plurality of users are capable of discovering the other ones of the plurality of users, and the ones of the plurality of items are capable of discovering the ones of the plurality of users, based on the associated collaborative content relevance.

2. A method for using an emergent self-organization characteristic in a natural language for establishing a collaborative content relevance between users and items in a context space, implemented using the computer system of claim 1, the method comprising the steps of:
    identifying a plurality of items in the context space with unique item identifiers, one of the plurality of items capable of being independently annotated in the context space by one or more of a plurality of users operating independently of one another without knowledge of each other's activities or existence, the annotating being done in the context space with unique user identifiers using an annotation of at least one keyword from the natural language during an annotation event, the annotation including an association between the at least one keyword, one of the unique item identifiers associated with the one of the plurality of items being independently annotated, and one of the unique user identifiers associated with the independently annotating one of the plurality of users, performed using the means for identifying;
    copying each of the annotations generated during ones of the annotation event to the at least one computer-readable media for storage therein, performed using the means for copying, the stored annotations containing the ones of the unique user identifier of the independently annotating ones of the plurality of users, the ones of the unique item identifier of the ones of the items being independently annotated, and the at least one keyword, ones of the plurality of users capable of using a different keyword to annotate the same one of the plurality of items;
    aggregating the stored annotations based on a correlation between users, items and keywords, the correlation associated with the emergent self organization characteristics to form the collaborative content relevance between the plurality of items and the plurality of users, performed using the means for aggregating the stored annotations; and
    associating, using the collaborative content relevance, one of: ones of the plurality of users with other ones of the plurality of users; and ones of the plurality of items with ones of the plurality of users such that the ones of the plurality of users are capable of discovering the other ones of the plurality of users, and the ones of the plurality of items are capable of discovering the ones of the plurality of users, based on the associated collaborative content relevance, performed using the means for associating.

3. The method of claim 2, further comprising:
    in the aggregating step, aggregating the stored annotations for each of the plurality of items such that the keywords associated with the item are aggregated from all the annotations of the item;

searching for one of the plurality of users based on the collaborative content relevance of the annotations associated with the one of the plurality of users and at least one search keyword associated with the searching; the collaborative content relevance established by one of:

determining items whose keywords match the at least one search keyword; and determining users that annotated the determined items; and returning the determined users as the search result.

4. The method according to claim 3, wherein the collaborative content relevance is further established by ranking the determined items on the basis of a Information Retrieval ranking algorithm and ranking the determined users based on a correspondence between ones of the ranked determined items and ones of the determined users that annotated the items; and returning the determined users according to rank as the search result.

5. The method according to claim 4, further comprising:
associating an advertisement with the at least one search keyword; and
delivering the advertisement to at least one of a subset of the highest-ranked determined relevant users.

6. The method according to claim 5, wherein the advertisement is selected from at least one from a group consisting of text, audio and video, and classified advertisement.

7. The method according to claim 3, further comprising:
considering each annotation as a synthetic hyperlink between the annotating user and the annotated item;
treating the determined users as hubs and determined items as authorities; and
using a link analysis ranking algorithm as the basis to compute the ranks for determined items and using a link analysis ranking algorithm to compute the ranks for the determined users.

8. The method according to claim 7, wherein the Link Analysis Ranking algorithm includes one of an Indegree algorithm, a HITS algorithm, a Randomized HITS algorithm, a Subspace HITS algorithm, a SALSA algorithm, a HUBAVG algorithm, an Authority Threshold family of algorithms, a MAX algorithm, a BFS algorithm, a BAYESIAN algorithm, a Simplified BAYESIAN algorithm, a PageRank algorithm, a Personalized PageRank algorithm, a TrafficRank algorithm, a Tensor decomposition algorithm, a TOPHITS algorithm, a CubeSVD algorithm, a PHITS algorithm, and a PLSA+PHITS algorithm.

9. The method according to claim 3, further comprising:
associating an advertisement with the at least one search keyword; and
delivering the advertisement to at least one of the determined users.

10. The method according to claim 9, wherein the advertisement is selected from at least one from a group consisting of text, audio and video, and classified advertisement.

11. The method according to claim 3, further comprising:
determining defining keywords for items where each defining keyword of an item is a keyword that has been used by more than a predetermined percentage of the users annotating the item;
restricting the determined items to items where the at least one search keyword matches at least one of the defining keywords of the item.

12. The method of claim 2 further comprising:
matching annotations that have the at least one search keyword;

in the aggregating step, aggregating the unique keywords of the matched annotations after removing the at least one searched keyword;
ranking the unique keywords based on the number of users or items;
sorting the unique keywords by rank;
presenting each such unique keyword as a sub-category that a user may drill-down; and
responding to the user's drill-down by appending the drill-down keyword to the at least one search keyword and re-issuing the search.

13. The method according to claim 12, wherein the annotations are generated from the clickstream of a search engine.

14. The method of claim 12 further comprising ranking drilldowns based on number of users and items.

15. The method according to claim 2, further comprising:
in the aggregating step, aggregating annotations by category contexts such that an annotation corresponds to a category context if it contains the keywords of the category context;
determining category contexts that have a predefined minimum number of unique user identifiers and a predefined minimum number of unique item identifiers in their aggregated annotations; and
clustering items and users simultaneously by category context such that the unique user identifiers for a determined category context is identified as a cluster of users and the unique item identifiers for the same determined category context is identified as a cluster of items.

16. The method according to claim 15, further comprising:
determining defining keywords for items where each defining keyword of an item is a keyword that has been used by more than a predetermined percentage of the users annotating the item;
restricting the aggregation of annotations by category contexts to annotations where at least one of the category context's keywords matches at least one of the defining keywords of the item in the annotation.

17. The method according to claim 15, further comprising:
associating an advertisement with a determined category context; and
delivering the advertisement to at least one of the relevant users.

18. The method according to claim 17, wherein the advertisement is selected from at least one from a group consisting of text, audio and video, and classified advertisement.

19. The method according to claim 15, further comprising:
associating an item with a determined one of the category contexts; and
publishing the item to the determined category context such that it is made available to any of the cluster of users associated with the category context.

20. The method according to claim 15, further comprising:
subscribing to items by a determined category context by a user; and
delivering items corresponding to the determined category context's cluster of items to the user.

21. The method according to claim 15, further comprising:
identifying a subset of the determined category contexts such that the category contexts of the identified subset have more people in its cluster of users relative to the determined category contexts as a whole and have fewer items in its cluster of items relative to the determined category contexts as a whole; and
presenting the identified subset of category contexts as hot topics.

22. The method according to claim 21, further comprising: allocating resources based on the hot topics.

23. The method according to claim 15, further comprising: offering drilldowns to a search based on the determined category contexts.

24. The method of claim 2, further comprising:
each item having at least one publisher identifier:
in the aggregating step, aggregating the annotations for each publisher identifier such that the keywords and the user identifiers associated with the publisher identifier are aggregated from all the annotations corresponding to the publisher identifier;
searching based on at least one keyword;
determining publisher identifiers that match the at least one searched keyword from the aggregated annotations corresponding to the publisher identifier; and
ranking the determined publisher identifiers.

25. The method according to claim 24, wherein the ranking of publisher identifiers is done using an information retrieval ranking algorithm.

26. The method according to claim 24, further comprising:
considering each annotation as a synthetic hyperlink between the annotating user and the publisher identifier;
treating the determined users as hubs and determined publisher identifiers as authorities; and
using a link analysis ranking algorithm as the basis to compute the ranks for determined publisher identifiers and using a link analysis ranking algorithm to compute the ranks for the determined users.

27. The method according to claim 26, wherein the Link Analysis Ranking algorithm includes one of an Indegree algorithm, a HITS algorithm, a Randomized HITS algorithm, a Subspace HITS algorithm, a SALSA algorithm, a HUBAVG algorithm, an Authority Threshold family of algorithms, a MAX algorithm, a BFS algorithm, a BAYESIAN algorithm, a Simplified BAYESIAN algorithm, a PageRank algorithm, a Personalized PageRank algorithm, a TrafficRank algorithm, a Tensor decomposition algorithm, a TOPHITS algorithm, a CubeSVD algorithm, a PHITS algorithm, and a PLSA+PHITS algorithm.

28. The method of claim 24 further comprising:
searching for items based on at least one keyword;
determining items whose keywords match the at least one search keyword;
and ranking the determined items based on the ranking of their publisher identifiers.

29. The method according to claim 28, further comprising:
personalizing the results for a user wherein the publisher identifiers are re-ranked based on the user's past annotations; and
re-ranking the items based on the new publisher identifier ranks; and
presenting the re-ranked items to the user.

30. The method according to claim 28, further comprising searching in a periodic fashion automatically based on a user profile.

31. The method according to claim 30 further comprising delivering an advertisement based on the user profile.

32. The method according to claim 31, wherein the advertisement is selected from at least one from a group consisting of text, audio and video, and classified advertisement.

33. The method according to claim 24, wherein the at least one search keyword is restricted to category contexts.

34. The method of claim 24 further comprising each item having at least one publisher identifier, and ranking the publisher identifiers in a category context.

35. The method according to claim 24, wherein the published item is an advertisement.

36. The method according to claim 24, further comprising:
determining defining keywords for items where each defining keyword of an item is a keyword that has been used by more than a predetermined percentage of the users annotating the item;
restricting the determined items to items where the at least one search keyword matches at least one of the defining keywords of the item.

37. The method as claimed in claim 2, further comprising:
publishing an item when a user annotates an item with a set of keywords;
in the aggregating step, aggregating the annotations for each item such that the keywords associated with the item are aggregated from all the annotations of the item;
determining items whose keywords match the at least one publishing keyword;
determining users that annotated the determined items; and
ranking the published item highly in searches for a subset of the determined users until a predetermined condition is fulfilled.

38. The method according to claim 37, further comprising:
ranking the determined users using an information retrieval algorithm; and
selecting the subset of the determined users from highly ranked users.

39. The method according to claim 38, wherein the information retrieval ranking algorithm is a link analysis ranking algorithm.

40. The method according to claim 39, wherein the Link Analysis Ranking algorithm includes one of an Indegree algorithm, a HITS algorithm, a Randomized HITS algorithm, a Subspace HITS algorithm, a SALSA algorithm, a HUBAVG algorithm, an Authority Threshold family of algorithms, a MAX algorithm, a BFS algorithm, a BAYESIAN algorithm, a Simplified BAYESIAN algorithm, a PageRank algorithm, a Personalized PageRank algorithm, a TrafficRank algorithm, a Tensor decomposition algorithm, a TOPHITS algorithm, a CubeSVD algorithm, a PHITS algorithm, and a PLSA+PHITS algorithm.

41. The method according to claim 37, further comprising:
determining defining keywords for items where each defining keyword of an item is a keyword that has been used by more than a predetermined percentage of the users annotating the item;
restricting the determined items to items where the at least one publishing keyword matches at least one of the defining keywords of the item.

42. The method according to claim 37, wherein the at least one publishing keyword is a category context.

43. The method according to claim 37, wherein the published item is an advertisement.

44. The method according to claim 43, wherein the advertisement consist of at least one from a group of text, audio and video, and classified advertisement.

45. The method according to claim 37, wherein the act of publishing an item corresponds to the completion of a step in a workflow process.

46. The method according to claim 45, wherein the step is one of a group comprising authorization, requesting, assigning, termination and notification.

47. The method according to claim 37, wherein the subset of users includes one of highly ranked publishers, highly ranked users and random selected users.

48. The method as claimed in claim 2, further comprising:
in the aggregating step, aggregating the annotations for each item such that the keywords associated with the item are aggregated from all the annotations of the item;
determining items whose keywords match the at least one search keyword;
determining defining keywords for items where each defining keyword of an item is a keyword that has been used by more than a predetermined percentage of the users annotating the item;
restricting the determined items to items where the at least one search keyword matches at least one of the defining keywords of the item;
determining users that annotated the determined items;
considering annotations as synthetic hyperlinks between the annotating user and the annotated item;
treating the determined users as hubs and determined items as authorities;
using a link analysis ranking algorithm as the basis to compute the ranks for determined items; and
returning the determined items sorted by rank as the search result.

49. The method according to claim 48, further comprising:
determining defining keywords for items where each defining keyword of an item is a keyword that has been used by more than a predetermined percentage of the users annotating the item; and
restricting the determined items to items where the at least one search keyword matches at least one of the defining keywords of the item.

50. The method according to claim 48, wherein the Link Analysis Ranking algorithm includes one of an Indegree algorithm, a HITS algorithm, a Randomized HITS algorithm, a Subspace HITS algorithm, a SALSA algorithm, a HUBAVG algorithm, an Authority Threshold family of algorithms, a MAX algorithm, a BFS algorithm, a BAYESIAN algorithm, a Simplified BAYESIAN algorithm, a PageRank algorithm, a Personalized PageRank algorithm, a TrafficRank algorithm, a Tensor decomposition algorithm, a TOPHITS algorithm, a CubeSVD algorithm, a PHITS algorithm, and a PLSA+PHITS algorithm.

51. The method according to claim 2, wherein the item includes one of a digital asset, a physical asset, a person, an animate entity, a text advertisement, a video advertisement, an event, a location, a state, a process, an act, a group, a concept, a file, an email, an instant message, a blog posting, a podcast, a web page, a web site, a web service, a data structure, a software module, a software object, an application, an operating system, a row in a table in a relational database, XML data and a resource represented in RDF.

52. The method according to claim 2, wherein the unique identifier includes one of a hash value, a URL, a URI, a URN, a UNC, a bar code, a RFID, a fiducial marker, an email address, a social security number, a vehicle registration number, and a telephone number.

53. The method according to claim 2, wherein the identifiers are globally unique.

54. The method according to claim 2, wherein each annotation event used to compute the result set contains all the keywords of the query.

55. The method according to claim 2, wherein the annotations are restricted to annotations that have taken place in a predetermined time interval.

56. The method according to claim 2, further comprising:
determining defining keywords for items where each defining keyword of an item is a keyword that has been used by more than a predetermined percentage of the users annotating the item; and
restricting the aggregated annotations to annotations wherein at least one keyword of the annotation matches at least one of the defining keywords of the annotated item.

57. The method according to claim 2, wherein the event source includes one of: remembering a dialog, publishing an item, tagging an item, collaboratively tagging an item, examining a clickstream of a search, underlining words in an item, the underlined words forming keywords for the item, saving a file to a file system, acquiring keywords from text of emails, acquiring keywords from text of documents, acquiring keywords from text of subject lines of mail messages, acquiring keywords from text of mail messages, and performing link text analysis.

58. The method according to claim 2, wherein the annotation event is digitally signed by the user.

59. The method according to claim 2, wherein the computer system comprises at least one server and the at least one processing unit is included in the at least one server, and wherein the annotation events are sent via a network to the at least one server for aggregation.

60. The method according to claim 59, wherein the network is the Internet.

61. The method according to claim 2, wherein at least one keyword is a machine representation of meaning.

62. The method according to claim 2, wherein at least one keyword is a semantic metadata.

63. The method according to claim 62, further describing the semantic metadata by at least one Lexicon and disambiguating the keywords of the search as well as the aggregated keywords of items and users based on the Lexicon.

64. The method of claim 2 further comprising:
identifying a plurality of items with unique item identifiers and a plurality of users with unique user identifiers at a search engine;
allowing a user to search based on keywords and displaying items that correspond to the search as a results,
monitoring items that the user clicks from among the results; and
tagging each clicked item with the keywords of the search and the user's unique identifier.

65. The method according to claim 2, wherein at least one keyword for the annotations is obtained from text included in one of emails, documents, mail messages, and subject lines.

66. The method according to claim 2, wherein the ranking is computed using an algorithm including one of a Tensor decomposition algorithm, a TOPHITS algorithm, a CubeSVD algorithm, and a PLSA+PHITS algorithm.

67. The computer system of claim 1, wherein the means for aggregating performs the function of aggregating the annotations for each item such that the keywords associated with the item are aggregated from all the annotations of the item, and wherein the at least one processing unit further includes:
means for searching for users based on at least one search keyword;
means for determining items whose keywords match the at least one search keyword;
means for determining users that annotated the determined items; and
means for returning the determined users as the search result.

68. The computer system of claim 1, wherein the means for aggregating performs the function of aggregating the unique keywords of the matched annotations after removing the at least one searched keyword, and wherein the at least one processing unit further includes:
- means for matching annotations that have the at least one search keyword;
- means for ranking the unique keywords based on the number of users or items;
- means for sorting the unique keywords by rank;
- means for presenting each such unique keyword as a subcategory that a user may drill-down; and
- means for responding to the user's drill-down by appending the drill-down keyword to the at least one search keyword and re-issuing the search.

69. The computer system of claim 1, wherein the means for aggregating performs the function of aggregating annotations by contexts such that an annotation corresponds to a context if it contains the keywords of the context, and wherein the at least one processing unit further includes:
- means for determining contexts that have a predefined minimum number of unique user identifiers and a predefined minimum number of unique item identifiers in their aggregated annotations; and
- means for clustering items and users simultaneously by context such that the unique user identifiers for a determined context is identified as a cluster of users and the unique item identifiers for the same determined context is identified as a cluster of items.

70. The computer system of claim 1,
wherein each item has at least one publisher identifier, and the means for aggregating performs the function of aggregating the annotations for each publisher identifier such that the keywords and the user identifiers associated with the publisher identifier are aggregated from all the annotations corresponding to the publisher identifier; and
wherein the at least one processing unit further includes
- means for searching for items based on at least one keyword;
- means for determining publisher identifiers that match the at least one searched keyword from the aggregated annotations corresponding to the publisher identifier; and
- means for ranking the determined publisher identifiers.

71. The computer system of claim 1, wherein the means for aggregating performs the function of aggregating the annotations for each item such that the keywords associated with the item are aggregated from all the annotations of the item, and wherein the at least one processing unit further includes:
- means for publishing an item when a user annotates an item with a set of keywords;
- means for determining items whose keywords match the at least one publishing keyword;
- means for determining users that annotated the determined items; and
- means for ranking the published item highly in searches for a subset of the determined users until a predetermined condition is fulfilled.

72. The computer system of claim 1, wherein the means for aggregating performs the function of aggregating the annotations for each item such that the keywords associated with the item are aggregated from all the annotations of the item, and wherein the at least one processing unit further includes:
- means for determining items whose keywords match the at least one search keyword;
- means for determining defining keywords for items where each defining keyword of an item is a keyword that has been used by more than a predetermined percentage of the users annotating the item;
- means for restricting the determined items to items where the at least one search keyword matches at least one of the defining keywords of the item;
- means for determining users that annotated the determined items;
- means for considering annotations as synthetic hyperlinks between the annotating user and the annotated item;
- means for treating the determined users as hubs and determined items as authorities;
- means for using a link analysis ranking algorithm as the basis to compute the ranks for determined items; and
- means for returning the determined items sorted by rank as the search result.

73. The computer system of claim 1, wherein the at least one processing unit further includes:
- means for identifying a plurality of items with unique item identifiers and a plurality of users with unique user identifiers at a search engine;
- means for allowing a user to search based on keywords and displaying items that correspond to the search as a results,
- means for monitoring items that the user clicks from among the results; and
- means for tagging each clicked item with the keywords of the search and the user's unique identifier.

\* \* \* \* \*